United States Patent
Smith et al.

(10) Patent No.: US 10,745,620 B2
(45) Date of Patent: Aug. 18, 2020

(54) REACTIVE MESOGEN FORMULATION WITH CONDUCTIVE ADDITIVE

(71) Applicant: Merck Patent GmbH, Darmstadt (DE)

(72) Inventors: Graham Smith, Warkworth (GB); Owain Llyr Parri, Ringwood (GB); Vicki Cook, Southampton (GB); Georg Bernatz, Darmstadt (DE); David Wilkes, Darmstadt (DE); Jonathan Henry Wilson, Southampton (GB); Mark James, Romsey (GB); Philip Edward May, Sidcup (GB)

(73) Assignee: Merck Patent GmbH, Darmstadt (DE)

( * ) Notice: Subject to any disclaimer, the term of this patent is extended or adjusted under 35 U.S.C. 154(b) by 123 days.

(21) Appl. No.: 15/630,493

(22) Filed: Jun. 22, 2017

(65) Prior Publication Data
US 2017/0283699 A1    Oct. 5, 2017

Related U.S. Application Data

(62) Division of application No. 14/377,579, filed as application No. PCT/EP2013/000005 on Jan. 3, 2013.

(30) Foreign Application Priority Data

Feb. 8, 2012   (EP) ..................... 12000814

(51) Int. Cl.
*C09K 19/38*   (2006.01)
*G02B 1/08*    (2006.01)
(Continued)

(52) U.S. Cl.
CPC .......... *C09K 19/3809* (2013.01); *C09K 19/04* (2013.01); *C09K 19/54* (2013.01);
(Continued)

(58) Field of Classification Search
CPC .... C09K 19/3809; C09K 19/04; C09K 19/54; C09K 19/582; C09K 2019/0448;
(Continued)

(56) References Cited

U.S. PATENT DOCUMENTS 3,803,050 A    4/1974   Mechlowitz B et al.
6,833,166 B2   12/2004  Hikmet
(Continued)

FOREIGN PATENT DOCUMENTS

DE    2722589 A1     11/1978
JP    2004534146 A   11/2004
(Continued)

OTHER PUBLICATIONS

Office Action for related Japanese Patent Application No. 2014-555960 dated Oct. 17, 2016.
(Continued)

*Primary Examiner* — Khanh T Nguyen
(74) *Attorney, Agent, or Firm* — Millen White Zelano and Branigan, PC; John Sopp

(57) ABSTRACT

The invention relates to a reactive mesogen (RM) formulation comprising a conductive additive, to a polymer film obtained thereof, and the use of the RM formulation and polymer film in optical or electrooptical components or devices, like optical retardation films for liquid crystal displays (LCDs).

19 Claims, 3 Drawing Sheets

(51) Int. Cl.
*C09K 19/04* (2006.01)
*C09K 19/54* (2006.01)
*C09K 19/58* (2006.01)
*G02B 5/30* (2006.01)
*C09K 19/52* (2006.01)

(52) U.S. Cl.
CPC .............. *C09K 19/582* (2013.01); *G02B 1/08* (2013.01); *G02B 5/3083* (2013.01); *C09K 2019/0448* (2013.01); *C09K 2019/523* (2013.01); *C09K 2219/03* (2013.01)

(58) Field of Classification Search
CPC .......... C09K 2019/523; C09K 2219/03; C09K 19/2007; G02B 1/08; G02B 5/3083; G02F 1/0009; C08F 20/10
USPC .................................................. 428/1.21, 402
See application file for complete search history.

(56) References Cited

U.S. PATENT DOCUMENTS

| | | | |
|---|---|---|---|
| 6,963,435 | B2 | 11/2005 | Mallya et al. |
| 7,023,600 | B2 | 4/2006 | Mallya et al. |
| 7,060,200 | B1 | 6/2006 | Farrand et al. |
| 8,481,146 | B2 | 7/2013 | Bastiaansen et al. |
| 9,005,721 | B2 | 4/2015 | Goetz et al. |
| 2003/0015688 | A1 | 1/2003 | Hikmet |
| 2003/0193709 | A1 | 10/2003 | Mallya et al. |
| 2005/0083564 | A1 | 4/2005 | Mallya et al. |
| 2006/0188662 | A1 | 8/2006 | Farrand et al. |
| 2007/0134444 | A1* | 6/2007 | Harding ............ C09K 19/2007 428/1.21 |
| 2010/0038598 | A1 | 2/2010 | Bastiaansen et al. |
| 2010/0104826 | A1 | 4/2010 | Bastiaansen et al. |
| 2010/0272925 | A1* | 10/2010 | Goetz ................... C09K 19/12 428/1.1 |

FOREIGN PATENT DOCUMENTS

| | | |
|---|---|---|
| JP | 2005527846 A | 9/2005 |
| JP | 2006073420 A | 3/2006 |
| JP | 2006514073 A | 4/2006 |
| JP | 2010520828 A | 6/2010 |
| JP | 2010520945 A | 6/2010 |
| KR | 20100117030 A | 11/2010 |
| WO | 03083523 A2 | 10/2003 |

OTHER PUBLICATIONS

English Abstract for JP2006073420, Publication Date: Mar. 16, 2006.
International Search Report for PCT/EP2013/000005 dated Mar. 21, 2013.
Derwent abstract of DE 2722589 (1978).
Cardiano et al., J. Mater. Chem., 2008, 18, 1253-1260.
Office Action in corresponding KR 1020147024770 dated Sep. 30, 2019 (pp. 1-5).
Cardiano et al.: Journal of materials Chemistry 2008,18,1253-1260.
Office Action and form 892 in copending U.S. Appl. No. 14/377,579 dated Mar. 9, 2020 (pp. 1-15).

* cited by examiner

REACTIVE MESOGEN FORMULATION WITH CONDUCTIVE ADDITIVE

FIELD OF THE INVENTION

The invention relates to a reactive mesogen (RM) formulation comprising a conductive additive, to a polymer film obtained thereof, and the use of the RM formulation and polymer film in optical or electrooptical components or devices, like optical retardation films for liquid crystal displays (LCDs).

BACKGROUND AND PRIOR ART

RMs and mixtures of RMs can be used to make optical films, like compensation, retardation or polarisation films, e.g. for use as components of optical or electrooptical devices like LC displays, through the process of in-situ polymerisation. The optical properties of the films can be controlled by various factors, such as mixture formulation or substrate properties.

The films are usually prepared by coating a solution of an RM or of an RM mixture on a substrate, removing the solvent, aligning the RMs into the desired orientation, and polymerising the coated and aligned RMs in situ by exposure to heat or actinic radiation, for example to UV radiation, and optionally removing the polymerised film from the substrate.

However, coating of a substrate with a solution containing RMs can lead to a build up of static charge if the solution is not conducting. This can lead to an electrostatic discharge by arcing, and, if the solvent is flammable, result in a fire or explosion. This hazard can be reduced by engineering solutions such as the use of tinsel and electrostatic neutralization bars. However, the rapid pumping of a non-conductive flammable fluid to a coating head can also lead to electrostatic discharge.

For example, a typical manufacturing method for such polymerised RM film products is roll to roll processing of a plastic substrate, in which coating of a reactive mesogen solution is an integral step. During the production steps there is the potential for build-up of electric charge, which must be discharged to prevent the danger of uncontrolled discharge, or the potential for defects or damage of the final product.

Moreover, the build up of static charge can lead to unwanted effects in polymerised optical films such as uneven coating, which can be visually observed and is often referred to as "mura".

It is generally known that such electrostatic charge build up can be mitigated if conducting solvents are used (see e.g. Matthew R. Giles in Organic Process Research & Development 2003, 7, 1048-1050), however, this greatly reduces the choice of solvents available to the formulator. This is especially disadvantageous because RMs are not commonly soluble in polar solvents. Besides, it is also possible that such solvents are not compatible with the substrates onto which the solution should be coated.

This invention has the aim of providing improved RM formulations and methods which enable the preparation of polymer films with reduced, or even without, build up of static charge, in order to avoid drawbacks and risks like electrostatic discharge by arcing, uneven coatings and optical defects like mura, while retaining the advantageous RM and film properties such as good coatability, good alignment and high durability. Other aims of the invention are immediately evident to the expert from the following description.

The inventors of the present invention found that these aims can be achieved by adding certain conductive additives to the RM formulation. Thereby the static build up when coating the mixture on a substrate is reduced, whilst other properties such as good coatability, alignment and durability are retained.

WO 2003/083523 discloses that polar additives can be added to liquid crystal (LC) mixtures, however their role is to induce electro-hydrodynamic instability in a bistable LC mode. The additives are therefore not polymerisable. WO 2008/110342 also describes the use of highly polar additives to enhance the properties of an RM formulation, but in this case, the additives are magnetic or paramagnetic particles. Also the formulations described in WO 2008/110342 are designed for inkjet printing rather than solution coating. WO 2008/110316 discloses the use of similar polar pigments in RM formulations that can be processed to prepare polarisation selective scattering devices for security devices. WO 2008/110317 describes the preparation of inkjettable RM formulations, but wherein the polar additives are pigmented or polymer additives. US 2011/0240927 describes a formulation that contains a direactive RM and a polar additive, and can be processed to make a transparent conducting layer as an alternative to the ITO electrodes that are commonly used as electrodes for LC display (LCD) manufacture. However, in this case, the amount of RM is limited to 20% and the formulation does not give a film that acts as a birefringent retardation film. In this case, the additives are PEDOT/PSS (poly-3,4-ethylenedioxy-thiophene/polystyrene sulphonate), which are not soluble in the solvents commonly used for RM formulations. However, the above-mentioned documents do neither disclose nor suggest the RM formulations, methods and uses as claimed in the present invention.

SUMMARY OF THE INVENTION

The invention relates to a formulation comprising >50% of one or more polymerisable mesogenic compounds, and further comprising one or more conductive additives, which are preferably selected from reactive organic compounds and/or ionic organic compounds.

The invention further relates to a polymer film comprising or consisting of a polymerised RM formulation as described above and below.

The invention further relates to a polymer film obtained by polymerising a layer of an RM formulation as described above and below, preferably wherein the RMs are aligned, and preferably at a temperature where the RM formulation exhibits a liquid crystal phase.

The invention further relates to the use of an RM formulation or polymer film as described above and below in polymer films, preferably for use as optical films, antistatic protection sheets or electromagnetic interference protection sheets.

The invention further relates to the use of an RM formulation or polymer film as described above and below in optical, electrooptical or electronic components or devices.

The invention further relates to an optical, electrooptical or electronic device or a component thereof, comprising an RM formulation or polymer film as described above and below.

Said components include, without limitation, optical retardation films, polarizers, compensators, beam splitters, reflective films, alignment layers, colour filters, antistatic protection sheets, or electromagnetic interference protection sheets, polarization controlled lenses for autostereoscopic 3D displays, and IR reflection films for window applications.

Said devices include, without limitation, electrooptical displays, especially liquid crystal displays, autostereoscopic 3D displays, organic light emitting diodes (OLEDs), optical data storage devices, and window applications.

DEFINITIONS OF TERMS

Figure 1:
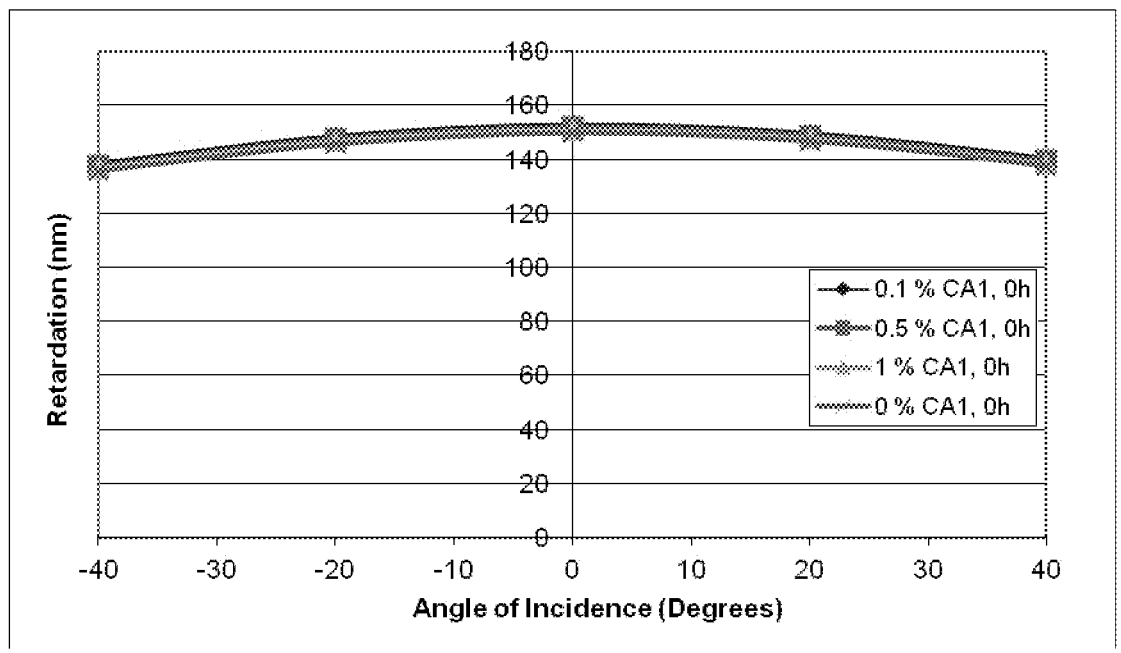
FIG. 1 shows the retardation versus viewing angle for polymer films prepared in accordance with example 2.

The term "liquid crystal", "mesomorphic compound, or "mesogenic compound" (also shortly referred to as "mesogen") means a compound that under suitable conditions of temperature, pressure and concentration can exist as a mesophase or in particular as a LC phase. Non-amphiphilic mesogenic compounds comprise for example one or more calamitic, banana-shaped or discotic mesogenic groups.

The term "calamitic" means a rod- or board/lath-shaped compound or group. The term "banana-shaped" means a bent group in which two, usually calamitic, mesogenic groups are linked through a semi-rigid group in such a way as not to be collinear.

The term "discotic" means a disc- or sheet-shaped compound or group.

The term "mesogenic group" means a group with the ability to induce liquid crystal (LC) phase behaviour. Mesogenic groups, especially those of the non-amphiphilic type, are usually either calamitic or discotic. The compounds comprising mesogenic groups do not necessarily have to exhibit an LC phase themselves. It is also possible that they show LC phase behaviour only in mixtures with other compounds, or when the mesogenic compounds or the mixtures thereof are polymerised. For the sake of simplicity, the term "liquid crystal" is used hereinafter for both mesogenic and LC materials.

A calamitic mesogenic compound is usually comprising a calamitic, i.e. rod- or lath-shaped, mesogenic group consisting of one or more aromatic or alicyclic groups connected to each other directly or via linkage groups, optionally comprising terminal groups attached to the short ends of the rod, and optionally comprising one or more lateral groups attached to the long sides of the rod, wherein these terminal and lateral groups are usually selected e.g. from carbyl or hydrocarbyl groups, polar groups like halogen, nitro, hydroxy, etc., or polymerisable groups.

A discotic mesogenic compound is usually comprising a discotic, i.e. relatively flat disc- or sheet-shaped mesogenic group consisting for example of one or more condensed aromatic or alicyclic groups, like for example triphenylene, and optionally comprising one or more terminal groups that are attached to the mesogenic group and are selected from the terminal and lateral groups mentioned above.

For an overview of terms and definitions in connection with liquid crystals and mesogens see Pure Appl. Chem. 73(5), 888 (2001) and C. Tschierske, G. Pelzl and S. Diele, Angew. Chem. 2004, 116, 6340-6368.

The term "reactive mesogen" (RM) means a polymerisable mesogenic or liquid crystalline compound, which is preferably a monomeric compound.

Polymerisable compounds with one polymerisable group are also referred to as "monoreactive" compounds, compounds with two polymerisable groups as "direactive" compounds, and compounds with more than two polymerisable groups as "multireactive" compounds. Compounds without a polymerisable group are also referred to as "non-reactive" compounds.

The term "ionic liquid (IL)" refers to organic salts that usually have melting points below 373 K. Review articles on ionic liquids are, for example, R. Sheldon "Catalytic reactions in ionic liquids", *Chem. Commun.*, 2001, 2399-2407; M. J. Earle, K. R. Seddon "Ionic liquids. Green solvent for the future", *Pure Appl. Chem.*, 72 (2000), 1391-1398; P. Wasserscheid, W. Keim "Ionische Flüssigkeiten—neue Lösungen für die Ubergangsmetallkatalyse" [Ionic Liquids—Novel Solutions for Transition-Metal Catalysis], *Angew. Chem.*, 112 (2000), 3926-3945; T. Welton "Room temperature ionic liquids. Solvents for synthesis and catalysis", *Chem. Rev.*, 92 (1999), 2071-2083 or R. Hagiwara, Ya. Ito "Room temperature ionic liquids of alkylimidazolium cations and fluoroanions", *J. Fluorine Chem.*, 105 (2000), 221-227.

The term "polymerisable ionic liquid (PIL)" means an ionic liquid with a polymerisable group attached to the cation via a spacer group.

The term "spacer" or "spacer group", also referred to as "Sp" below, is known to the person skilled in the art and is described in the literature, see, for example, Pure Appl. Chem. 73(5), 888 (2001) and C. Tschierske, G. Pelzl, S. Diele, Angew. Chem. 2004, 116, 6340-6368. Unless stated otherwise, the term "spacer" or "spacer group" above and below denotes a flexible organic group, which in a polymerisable mesogenic compound ("RM") connects the mesogenic group and the polymerisable group(s).

The term "film" includes rigid or flexible, self-supporting or free-standing films with mechanical stability, as well as coatings or layers on a supporting substrate or between two substrates. "Thin film" means a film having a thickness in the nanometer or micrometer range, preferably at least 10 nm, very preferably at least 100 nm, and preferably not more than 100 μm, very preferably not more than 10 μm.

The term "carbyl group" means any monovalent or multivalent organic radical moiety which comprises at least one carbon atom either without any non-carbon atoms (like for example —C≡C—), or optionally combined with at least one non-carbon atom such as N, O, S, P, Si, Se, As, Te or Ge (for example carbonyl etc.). The term "hydrocarbyl group" denotes a carbyl group that does additionally contain one or more H atoms and optionally contains one or more hetero atoms like for example N, O, S, P, Si, Se, As, Te or Ge. A carbyl or hydrocarbyl group comprising a chain of 3 or more C atoms may also be linear, branched and/or cyclic, including spiro and/or fused rings.

DETAILED DESCRIPTION

In the RM formulations of the present invention the conductive additives allow for an increase in conductivity. The increase of conductivity of the RM formulation enables the preparation of polymer films with reduced, or even without, build up of static charge during the film forming process, and thereby avoids hazards like spontaneous and undesired electrostatic discharge by arcing. In addition, it reduces or avoids uneven coatings and optical defects like mura, while retaining the advantageous RM and film properties such as good coatability, good alignment and high durability.

In a first preferred embodiment of the present invention the conductive additives are ionic organic compounds, or organic salts, of the formula $C^+A^-$, wherein $C^+$ is an organic cation and $A^-$ is an anion, for example selected from quaternary ammonium salts, phosphonium salts, imidazolium salts or other N-heterocyclic salts.

Many of these organic salts are also known as ionic liquids (IL). Ionic liquid molecules provide soft, bulky ions that have the ability to dissociate in low dielectric constant liquids. Preferably, the anion has a van der Waals volume of at least 80 $Å^3$.

In a second preferred embodiment the conductive additives are selected from organic compounds that are both ionic and reactive, i.e. ionic organic compounds comprising one or more polymerisable functional groups, or polymerisable ionic liquids (PIL). Preferably a polymerisable ionic compound or PIL is used, where the cation is modified with a polymerisable group to incorporate soft, bulky ions into the polymer formed by the RM formulation. This is then copolymerised with the RMs contained in the RM formulation to form a polymer film.

In a third preferred embodiment of the present invention the conductive additives are selected from reactive organic compounds comprising one or more polar groups which increases the conductivity of the RM formulation, and further comprising one or more polymerisable functional groups which can co-polymerise with the RMs forming a polymer network.

By careful selection of the additive, for example by selection of the type of ionic components or polymerisable functional group, it can be achieved that the processing and properties of the RM formulation and of the final polymerised film, are unchanged or only slightly changed, compared to an RM formulation without a conductive additive.

The ionic organic compounds preferably contain an organic cation, very preferably selected from the group consisting of ammonium, phosphonium, sulfonium, uronium, thiouronium, guanidinium, and heterocyclic cations such as imidazolium, pyridinium, pyrrolidinium, triazolium, morpholinium or piperidinium cation.

Preferred heterocyclic cations are selected from the group consisting of

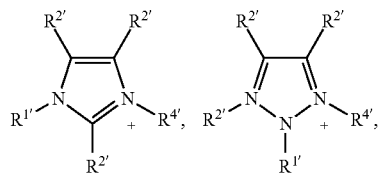

imidazolium      1H-pyrazolium

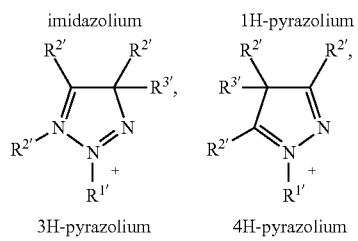

3H-pyrazolium    4H-pyrazolium

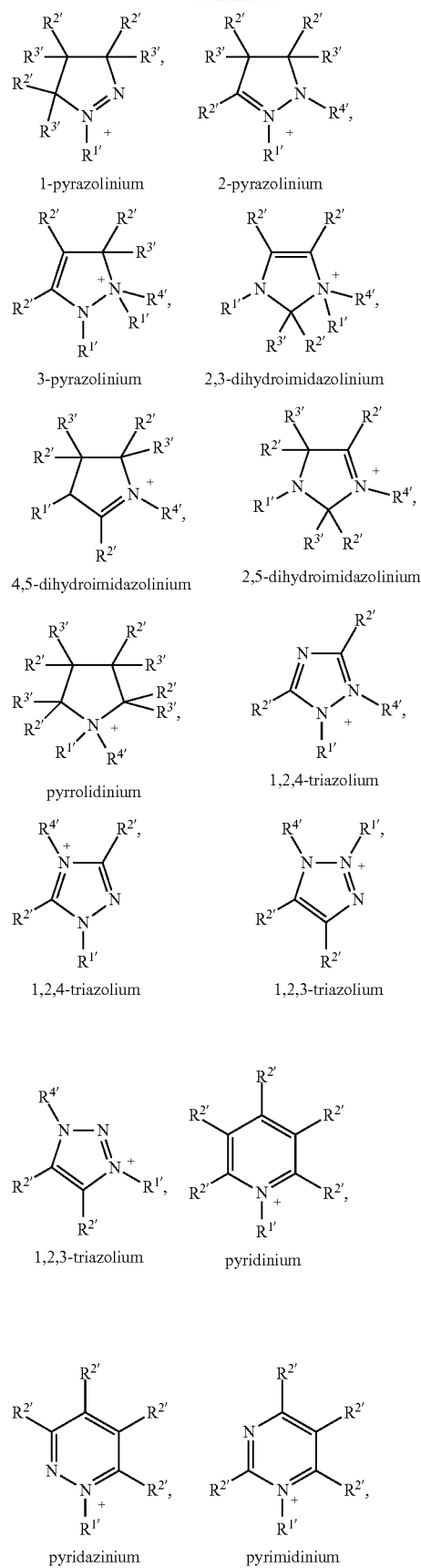

1-pyrazolinium    2-pyrazolinium 3-pyrazolinium    2,3-dihydroimidazolinium 4,5-dihydroimidazolinium    2,5-dihydroimidazolinium pyrrolidinium    1,2,4-triazolium 1,2,4-triazolium    1,2,3-triazolium 1,2,3-triazolium    pyridinium pyridazinium    pyrimidinium -continued

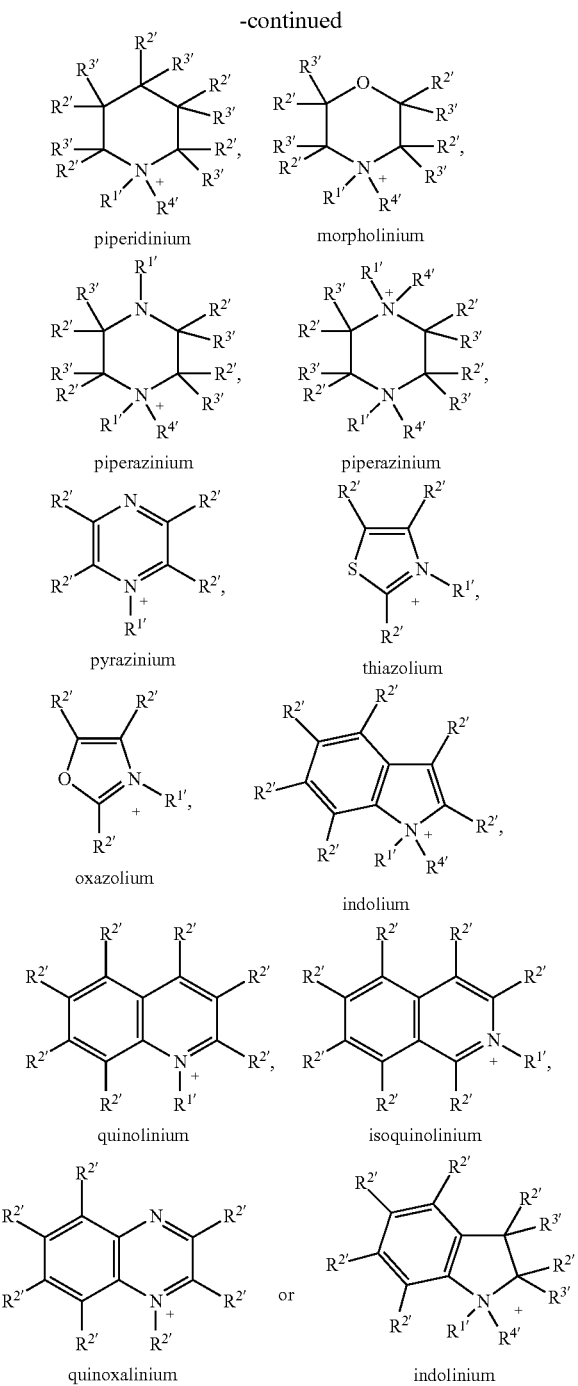

wherein the substituents $R^{1'}$ to $R^{4'}$ each, independently of one another, denote
a straight-chain or branched alkyl having 1-20 C atoms, which optionally can be partially fluorinated, but not in α-position to hetero-atom, and which can also include oxygen or/and sulfur atoms in any positions in between carbon atoms, or
saturated, partially or fully unsaturated cycloalkyl having 5-7 C atoms, which may be substituted by alkyl groups having 1-6 C atoms, and wherein the substituents $R^{1'}$, $R^{2'}$, $R^{3'}$ and/or $R^{4'}$ together may also form a ring system, and, in case of reactive compounds, one of the substituent $R^{1'}$ to $R^{4'}$ may also denote a spacer group Sp that is linked to a polymerisable functional group.

Preferably, the cation $C^+$ is an alkyl substituted ammonium, pyridinium, pyrrolidinium or imidazolium group, very preferably a tetraalkylammonium, tetraalkylphosphonium, N-alkylpyridinium, N,N-dialkylpyrrolidinium, 1,3-dialkylimidazolium or trialkylsulfonium cation.

Very preferably the cation $C^+$ is selected from the group consisting of tetraalkyl ammonium, tetraaryl ammonium, or mixed tetra alkyl-aryl ammonium, wherein the alkyl or aryl groups may be identical or different from each other, furthermore heterocyclic ammonium, protonated alkyl or aryl ammonium or other nitrogen based ions such as dilauryl ammonium. Preferred examples include, without limitation, tetraalkylammonium, 1-alkyl-3-methylimidazolium, 1-alkyl-2,3-dimethylimidazolium, N-alkyl-3-methyl-pyridinium, N-alkyl-3-hydroxypropyl-pyridinium, N-alkyl-3-hydroxymethyl-pyridinium, N-alkyl-4-dimethylamino-pyridinium, N-methyl-N-alkyl-pyrrolidinium, wherein "alkyl" denotes an alkyl group having 1, 2, 3, 4, 5 or 6 C atoms.

The anion is preferably an inorganic anion, very preferably a halide, borate, imide, phosphate, sulfonate, sulfate, succinate, naphthenate or carboxylate anion.

Very preferably the anion is selected from the group consisting of halides, hydrogensulfate, alkylsulfates, fluoroalkyl-phosphates, hexafluorophosphate, bis(trifluoromethylsulfonyl)imide, formate, trifluoroacetate, tetrafluoroborate, oxalatoborate, tetracyanoborate, dicyanamide, tricyanomethide, thiocyanate, methanesulfonate, triflate (trifluoromethane-sulfonate), nonaflate (nonafluorobutane-sulfonate), tosylate (toluene-sulfonate) and hydrogensulfate.

Most preferably the anion is selected from the group consisting of $Cl^-$, $Br^-$, $I^-$, $[HSO_4]^-$, $[CH_3SO_4]^-$, $[C_2H_5SO_4]^-$, $[C_4H_9SO_4]^-$, $[C_6H_{13}SO_4]^-$, $[C_8H_{17}SO_4]^-$, $[C_5H_{11}O_2SO_4]^-$, $[(C_2F_5)_3PF_3]^-$, $[PF_6]^-$, $[N(SO_2CF_3)_2]^-$, $[HCOO]^-$, $[CF_3COO]^-$, $[BF_4]^-$, $[B(C_2O_4)_2]^-$, $[B(CN)_4]^-$, $[N(CN)_2]^-$, $[C(CN)_3]^-$, $[SCN]^-$, $[CH_3SO_3]^-$, $[CF_3SO_3]^-$, $[C_4F_9SO_3]^-$, $[CH_3C_6H_4SO_3]^-$.

Further preferred anions are selected from the group consisting of
chloride
bromide
iodide
tetrafluoroborate
tetracyanoborate (TCB)
difluoro-dicyano borate
fluoro-tricyano borate
perfluoroalkyl-fluoro-dicyano borate
pentafluoroethyl-fluoro-dicyano borate
perfluoroalkyl-difluoro-cyano borate
pentafluoroethyl-difluoro-cyano borate
perfluoroalkyl-fluoro borate (FAB)
perfluoroalkyl-alkoxy-dicyano borate
alkoxy-tricyano borate
methoxy-tricyano borate
ethoxy-tricyano borate
2,2,2-trifluoroethoxy-tricyano borate
bis(2,2,2-trifluoroethoxy)-dicyano borate
tetraphenylborate (TPB)
tetrakis(3,5-bis(trifluoromethyl)phenyl)borate (TFPB)
tetrakis(4-chlorophenyl)borate
tetrakis(4-fluorophenyl)borate
tetrakis(pentafluorophenyl)borate
tetrakis(2,2,2-trifluoroethoxy)borate
bis(oxalato)borate
bis(trifluoromethylsulfonyl)imide (NTF)
bis(fluorosulfonyl)imide
bis[bis(pentafluoroethyl)phosphinyl]imide (FPI)
tris(trifluoromethylsulfonyl)methide (fluoroalkyl)fluorophosphate
tris(pentafluoroethyl)trifluorophosphate (FAP)
bis(pentafluoroethyl)tetrafluorophosphate
(pentafluoroethyl)pentafluorophosphate
tris(nonafluorobutyl)trifluorophosphate
bis(nonafluorobutyl)tetrafluorophosphate
(nonafluorobutyl)pentafluorophosphate
hexafluorophosphate
bis(fluoroalkyl)phosphinate
bis(pentafluoroethyl)phosphinate
bis(nonafluorobutyl)phosphinate
(fluoroalkyl)phosphonate
(pentafluoroethyl)phosphonate
(nonafluorobutyl)phosphonate
nonafluorobutane sulfonate (nonaflate) (NFS)
trifluoromethanesulfonate
trifluoroacetate
methanesulfonate
butanesulfonate
butylsulfate
hexylsulfate
octylsulfate
dicyanamide
tricyanomethide
thiocyanate
hydrogensulfate
trifluoroacetate
tosylate
docusates: (bis(2-2-ethyl hexyl) sulfosuccinate (AOT)
naphthenates
lauryl sulphate
alkyl benzene sulfonates (dodecyl benzene sulfonates, linear and branched)
alkyl naphthalene sulfonate
alkyl aryl ether phosphates
alkyl ether phosphate
alkyl carboxylates: stearate, octoates, heptanoate,
wherein preferably "alkyl" is $C_1$-$C_{20}$ alkyl, "fluoroalkyl" is fluorinated $C_1$-$C_{20}$ alkyl, "perfluoroalkyl" is $C_1$-$C_{20}$ perfluoroalkyl, and "aryl" is optionally substituted $C_5$-$C_8$-aryl, preferably benzene.

Examples of suitable and preferred anions of this group include, without limitation, tetracyanoborate (TCB), tetraphenylborate (TPB), tetrakis(3,5-bis(trifluoromethyl)phenyl)borate (TFPB), bis(trifluoromethylsulfonyl)imide (NTF), tris(pentafluoroethyl)trifluorophosphate (FAP), bis[bis(pentafluoroethyl)phosphinyl]imide (FPI), nonafluorobutane sulfonate (nonaflate) (NFS), (bis(2-2-ethyl hexyl) sulfosuccinate (AOT), pentafluoroethyl-dicyano-fluoro borate, methoxy-tricyano borate, ethoxy-tricyano borate and 2,2,2-trifluoroethoxy-tricyano borate.

Preferred fluoroalkyl phosphate anions (FAP-anions) include $[PF_3(C_2F_5)_3]^-$, $[PF_3(C_4F_9)_3]^-$, $[PF_3(C_3F_7)_3]^-$, $[PF_4(C_2F_5)_2]^-$, $[PF_5(C_2F_5)]^-$, Preferred fluoroalkyl-fluoro borate anions (FAB anions) include $[B(CF_3)_4]^-$, $B(C_2F_5)_4]^-$, $[BF_3(CF_3)]^-$, $[BF_3(C_2F_5)]^-$, $[BF_3(i-C_3F_7)]^-$, $[BF_2(CF_3)_2]^-$, $[BF_2(C_2F_5)_2]^-$, $[BF_2(CF_3)_2]^-$, $[BF(C_2F_5)_3]^-$, $[BF(CF_3)_3]^-$ oder $[BF(CF_3)(C_2F_5)_2]^-$.

Preferred examples of ionic organic compounds are for example tetra-n-butyl ammonium chloride, tetraoctyl ammonium bromide, benzyl tridecylammonium benzene sulfate, diphenyl didodecyl ammonium hexafluorophosphate, N-Methyl-N-trioctyl-ammonium bis(trifluoromethylsulfonyl)imide, or mixtures thereof.

The reactive ionic organic compounds, or polymerisable ionic liquids, of the second preferred embodiment, hereinafter also referred to as "polymerisable ionic compounds", are preferably selected of formula 1:

$$P^1\text{-Sp-}C^+A^- \qquad 1$$

wherein $P^1$ is a polymerisable group, Sp is a spacer group or a single bond, $C^+$ is a cation, and $A^-$ is an anion.

Preferred compounds of formula 1 are selected of formula 1a-c:

$$P^1\text{-Sp-}[NR^aR^bR^c]^+A^- \qquad 1a$$

$$P^1\text{-Sp-}[PR^aR^bR^c]^+A^- \qquad 1b$$

$$P^1\text{-Sp-}[SR^aR^bR^c]^+A^- \qquad 1c$$

wherein $P^1$, Sp and $A^-$ are as defined in formula 1,
$R^a$, $R^b$, $R^c$ independently of each other denote straight-chain, branched or cyclic alkyl with 1 to 25, preferably 1 to 10 C-atoms, wherein one or more $CH_2$ groups are optionally replaced, in each case independently from one another, by —O—, —S—, —NH—, —$NR^0$—, —CO—, —CH=CH— or —C≡C— in such a manner that O and/or S atoms are not linked directly to one another, and wherein one or more H atoms may also be replaced by F, Cl, Br, I or CN, or two of $R^a$, $R^b$ and $R^c$ together with the N- P- or S-atom of the cation form an aliphatic or aromatic ring with 4 to 8 C atoms which is optionally substituted by one or more groups L,
L is $P^1$-Sp-, F, Cl, Br, I, —CN, —$NO_2$, —NCO, —NCS, —OCN, —SCN, —C(=O)$NR^{00}R^{000}$, —C(=O)X, —C(=O)$OR^{00}$, —C(=O)$R^0$, —$NR^{00}R^{000}$, —OH, —$SF_5$, optionally substituted silyl, aryl or heteroaryl with 1 to 12, preferably 1 to 6 C atoms, and straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl,
$R^{00}$ and $R^{000}$ independently of each other denote H or alkyl with 1 to 12 C-atoms, and
X is halogen, preferably F or Cl,
Preferred compounds of formula 1a-c are selected of formula 1a1-1c1:

$$P^1\text{—}(CH_2)_t\text{—}[NR^aR^bR^c]^+A^- \qquad 1a1$$

$$P^1\text{—}(CH_2)_t\text{—}[PR^aR^bR^c]^+A^- \qquad 1b1$$

$$P^1\text{—}(CH_2)_t\text{—}[SR^aR^bR^c]^+A^- \qquad 1c1$$

wherein $P^1$, $R^a$, $R^b$, $R^c$ and $A^-$ are as defined in formula 1 and 1a-1c, and t is an integer from 1 to 12.

$P^1$ is preferably an acrylate or methacrylate group. $R^a$, $R^b$ and $R^c$ preferably denote straight-chain or branched alkyl with 1 to 12 C atoms, very preferably methyl or ethyl.

$A^-$ is preferably an anion selected from the group of preferred or very preferred anions as defined above.

$R^a$, $R^b$ and $R^c$ preferably are selected from the group consisting of
a straight-chain or branched alkyl having 1-20 C atoms, which optionally can be partially fluorinated, but not in α-position to hetero-atom, and which can also include oxygen or/and sulfur atoms in any positions in between carbon atoms,
saturated, partially or fully unsaturated cycloalkyl having 5-7 C atoms, which may be substituted by alkyl groups having 1-6 C atoms.

Very preferably $R^a$, $R^b$ and $R^c$ denote straight-chain or branched alkyl having 4-20 C atoms, preferably 4-10 C atoms.

Preferred polymerisable cations $P^1$-Sp-$C^+$ are selected from the group consisting of:
N-[2-(methacryloyloxy)ethyl]-N,N,N-trialkylammonium
N-[2-(methacryloyloxy)ethyl]-N,N,N-trimethylammonium (MOTMA)
N-[2-(methacryloyloxy)propyl]-N,N,N-trimethylammonium
N-[2-(methacryloyloxy)ethyl]-N,N,N-trihexylammonium (MOTHA)
N-[2-(methacryloyloxy)propyl]-N,N,N-trihexylammonium
N-[(2-methacryloxy)-(AO)$_x$-A]-N,N,N-trialkylammonium
1-[2-(methacryloyloxy)ethyl]-3-butylimidazolium
1-(2-methacryloxyethyl)-3-methylimidazolium
1-[(2-methacryloxy)-(AO)$_x$-A]-3-methylimidazolium
1-[2-(methacryloyloxy)ethyl]-1-butylpyrrolidinium
1-(2-methacryloxyethyl)-1-methylpyrrolidinium
1-[(2-methacryloxy)-(AO)$_x$-A]-1-methylpyrrolidinium
wherein (AO)$_x$ is a polyalkyl oxide preferably with x=1-10, especially
with x=2-4 and A especially=ethylene, propylene,
1-[(2-methacryloxy)-C$_y$-]-3-methylimidazolium,
1-[(2-methacryloxy)-C$_y$-]-1-methylpyrrolidinium,
wherein C, is an alkyl chain preferably with y=1 to 12, especially with y=1 to 4,
N-(acryloxy-ethyl)-N,N,N-trimethyl ammonium (AOTMA),
N-(acryloxy-ethyl)-N,N,N-trihexyl ammonium (AOTHA),
N-(acryloxy-propyl)-N,N,N-trihexyl ammonium
N-[3-(methacryloylamino)propyl]-N,N,N-trimethylammonium
N-[3-(methacryloylamino)propyl]-N,N,N-trihexylammonium
N,N,N,N-tetraallyl ammonium
1-allyl-3-methylimidazolium
1-allyl-1-methylpyrrolidinium
N-butyl-4-vinyl-pyridinium
N-ethyl-4-vinyl-pyridinium
N-methyl-4-vinyl-pyridinium
N-methyl-2-vinyl-pyridinium
N,N-diallyl-N,N-dimethyl ammonium
N-(vinylbenzyl)-N,N,N-trimethylammonium Very preferred polymerisable cations include, without limitation, N-[2-(methacryloyloxy)ethyl]-N,N,N-trimethylammonium (MOTMA) and N-[2-(methacryloyloxy)ethyl]-N,N,N-trihexylammonium (MOTHA).

Suitable and preferred polymerisable ionic compounds include, without limitation, the compounds listed in Table 1.

TABLE 1

| Ref. | Polymerisable Cation | Anion |
|---|---|---|
| MOTMA-TFPB | [structure] | [tetrakis(3,5-bis(trifluoromethyl)phenyl)borate] |
| MOTHA-TFPB | [structure] | [tetrakis(3,5-bis(trifluoromethyl)phenyl)borate] |
| MOTHA-FAP | [structure] | $[(C_2F_5)_3PF_3]^-$ |
| MOTHA-NFS | [structure] | $[C_4F_9SO_3]^-$ |

TABLE 1-continued

| Ref. | Polymerisable Cation | Anion |
|------|---------------------|-------|
| MOTHA-NTF | methacryloyloxyethyl-N,N,N-trihexylammonium | $[N(SO_2CF_3)_2]^-$ |
| MOTHA-TCB | methacryloyloxyethyl-N,N,N-trihexylammonium | $[B(CN)_4]^-$ |
| MOTMA-AOT | methacryloyloxyethyl-N,N,N-trimethylammonium | bis(2-ethylhexyl) sulfosuccinate |
| MOTMA-NTF | methacryloyloxyethyl-N,N,N-trimethylammonium | $[N(SO_2CF_3)_2]^-$ |
| MOTMA-C | methacryloyloxyethyl-N,N,N-trimethylammonium | $Cl^-$ |
| MOTMA-MS | methacryloyloxyethyl-N,N,N-trimethylammonium | $[CH_3SO_3]^-$ |

Especially preferred are polymerisable ionic compounds comprising as cation N-[2-(methacryloyloxy)ethyl]-N,N,N-trimethylammonium (MOTMA), N-[2-(methacryloyloxy)propyl]-N,N,N-trimethylammonium, N-[2-(acryloyloxy)ethyl]-N,N,N-trimethylammonium (AOTMA), N-[2-(methacryloyloxy)ethyl]-N,N,N-trihexylammonium (MOTHA), N-[2-(methacryloyloxy)propyl]-N,N,N-trihexylammonium or N-[2-(acryloyloxy)ethyl]-N,N,N-trihexylammonium (AOTHA) and as anion tetraphenylborate, tetrakis(3,5-bis(trifluoromethyl)phenyl)borate or (bis(2-2-ethyl hexyl) sulfosuccinate. Especially preferred are the methacrylate compounds.

The reactive organic compounds of the third preferred embodiment preferably contain one or more polymerisable functional groups, and one or more polar groups that increase the conductivity of the RM formulation. They are preferably selected of formula 2

$$P^1\text{-}Sp^3\text{-}G \qquad 2$$

wherein $P^1$ is a polymerisable group, $Sp^3$ is an alkylene spacer with 2 to 12 C atoms, which is optionally substituted with one or more groups G, and wherein one or more $CH_2$ groups are optionally replaced by —O—, —S—, —CO—, $NR^{00}R^{000}$ or denotes a single bond, wherein $R^{00}$ and $R^{000}$ independently of each other denote H or alkyl with 1 to 12 C-atoms, and G is a polar group, preferably selected from COOH, OH, $NH_2$, $NO_2$, $SO_3H$, SH, $PO_3H_2$, and benzene that is mono- or polysubstituted with COOH, OH, $NH_2$, $NO_2$, $SO_3H$, SH or $PO_3H_2$.

$P^1$ is preferably an acrylate or methacrylate group. Sp is preferably alkylene with 1 to 12 C atoms.

Preferred compounds of formula 2 are those of formula 2a and 2b:

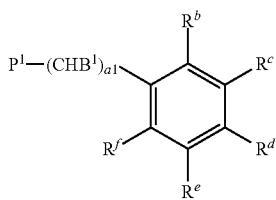

2a

2b wherein
P¹ is a polymerisable group,
B¹ is H, $R^a$, or

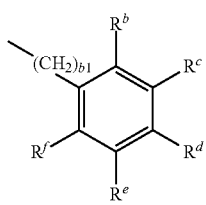

B² is H or $R^a$,
$R^a$ is, on each occurrence identically or differently, OH, COOH, $NH_2$, $NO_2$, $SO_3H$, SH, $PO_3H_2$,
$R^{b-f}$ are independently of each other H or $R^a$, wherein at least one of $R^{b-f}$ denotes $R^a$,
a1 is an integer from 2 to 12,
b1 is an integer from 0 to 12.
P¹ is preferably an acrylate or methacrylate group.

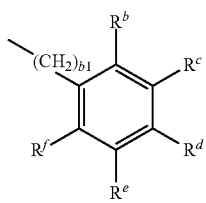

is preferably

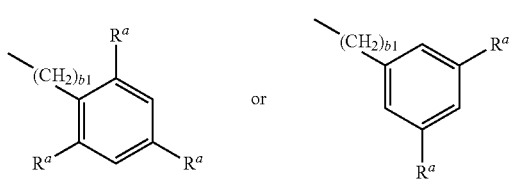

wherein $R^a$ and b1 are as defined in formula 2.
a1 is preferably 2, 3, 4, 5 or 6.
Preferred compounds of formula 2a and 2b are those of the following formulae:

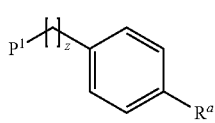

2a1

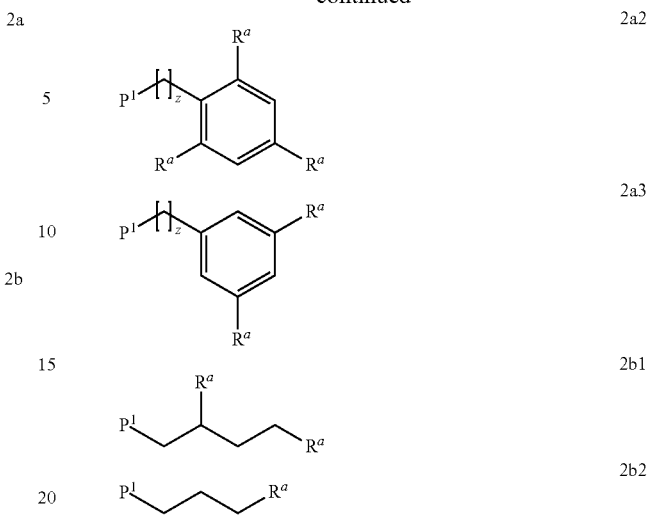

wherein P¹ and $R^a$ are as defined in formula 2a, P¹ is preferably an acrylate or methacrylate group, $R^a$ is preferably OH or COOH, and z is an integer from 2 to 12, preferably 2, 3, 4, 5 or 6.

Suitable and preferred compounds of formula 2a and 2b include, without limitation, the following compounds:

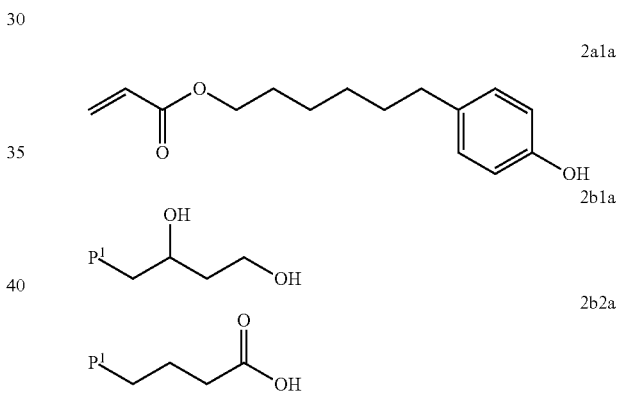

wherein P¹ is as defined in formula 2a, and is preferably an acrylate or methacrylate group.

Scheme 1 shows by way of example of MOTMA the synthesis of polymerisable ionic compounds of the invention by ion exchange, which can be carried out under conditions known to the person skilled in the art.

Scheme 1

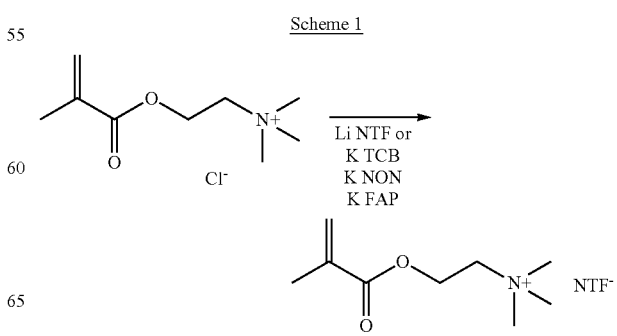

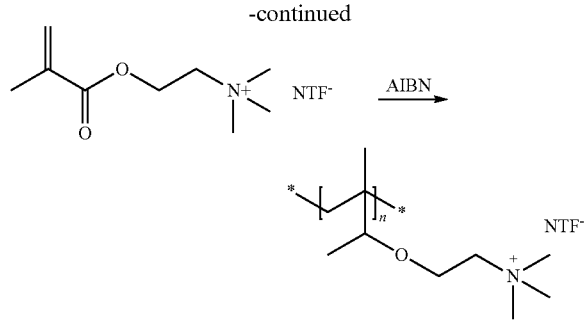

Equimolar ratios of polymerisable cations and salts comprising the desired anion are reacted; for example Li NTF or K FAP or K NFS or K TCB with MOTMA Cl or MOTHA Cl. The polymerisable ionic liquids can be polymerised as show in Scheme 1.

The salts of NTF, FAP, NFS, TCB or MOTMA are commercially available or can be synthesised by known methods, for example salts containing tetracyanoborate anions in accordance with the disclosure of WO 2004/072089.

The synthesis of several polymerisable ionic liquids is known from the literature. For example, the preparation of 1-allyl-3-methylimidazolium bis(pentafluoroethyl)phosphinate from tris(pentafluoroethyl)phosphine oxide, N-methylimidazole, and allyl alcohol is described in WO 2005/049555.

Fluoroalkylborate anions (FAB) and processes for their preparation are described in EP 1205480 and EP 1229038.

The preparation of further compounds according to the invention can be carried out analogously to the illustrative reactions shown above. The preparation of further compounds according to the invention can also be carried out by other methods known per se to the person skilled in the art from the literature. In particular, other catalysts can be used.

The invention furthermore relates to the novel ionic organic compounds or polymerisable ionic compounds as shown above and below.

Preferably the RM formulation comprises one or more polymerisable mesogenic compounds having only one polymerisable functional group (monoreactive), and one or more polymerisable mesogenic compounds having two or more polymerisable functional groups (di- or multireactive).

The di- or multireactive RMs are preferably selected of formula I $$P^1\text{-}Sp^1\text{-}MG\text{-}Sp^2\text{-}P^2 \qquad \text{I}$$

wherein $P^1$ and $P^2$ independently of each other denote a polymerisable group, $Sp^1$ and $Sp^2$ independently of each other are a spacer group or a single bond, and MG is a rod-shaped mesogenic group, which is preferably selected of formula II

wherein $A^1$ and $A^2$ denote, in case of multiple occurrence independently of one another, an aromatic or alicyclic group, which optionally contains one or more heteroatoms selected from N, O and S, and is optionally mono- or polysubstituted by L, L is P-Sp-, F, Cl, Br, I, —CN, —NO$_2$, —NCO, —NCS, —OCN, —SCN, —C(=O)NR$^{00}$R$^{000}$, —C(=O)X, —C(=O)X, —C(=O)OR$^{00}$, —C(=O)R$^0$, —NR$^{00}$R$^{000}$, —OH, —SF$_5$, optionally substituted silyl, aryl or heteroaryl with 1 to 12, preferably 1 to 6 C atoms, and straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, $R^{00}$ and $R^{000}$ independently of each other denote H or alkyl with 1 to 12 C-atoms, X is halogen, preferably F or Cl, $Z^1$ denotes, in case of multiple occurrence independently of one another, —O—, —S—, —CO—, —COO—, —OCO—, —S—CO—, —CO—S—, —O—COO—, —CO—NR$^{00}$—, —NR$^{00}$—CO—, —NR$^{00}$—CO—NR$^{000}$, —NR$^{00}$—CO—O—, —O—CO—NR$^{00}$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_{n1}$—, —CF$_2$CH$_2$—, —CH$_2$CF$_2$—, —CF$_2$CF$_2$—, —CH=N—, —N=CH—, —N=N—, —CH=CR$^{00}$—, —CY$^1$=CY$^2$—, —C≡C—, —CH=CH—COO—, —OCO—CH=CH— or a single bond, preferably —COO—, —OCO— or a single bond, $Y^1$ and $Y^2$ independently of each other denote H, F, Cl or CN, n is 1, 2, 3 or 4, preferably 1 or 2, most preferably 2, n1 is an integer from 1 to 10, preferably 1, 2, 3 or 4.

Preferred groups $A^1$ and $A^2$ include, without limitation, furan, pyrrol, thiophene, oxazole, thiazole, thiadiazole, imidazole, phenylene, cyclohexylene, bicyclooctylene, cyclohexenylene, pyridine, pyrimidine, pyrazine, azulene, indane, fluorene, naphthalene, tetrahydronaphthalene, anthracene, phenanthrene and dithienothiophene, all of which are unsubstituted or substituted by 1, 2, 3 or 4 groups L as defined above.

Particular preferred groups $A^1$ and $A^2$ are selected from 1,4-phenylene, pyridine-2,5-diyl, pyrimidine-2,5-diyl, thiophene-2,5-diyl, naphthalene-2,6-diyl, 1,2,3,4-tetrahydronaphthalene-2,6-diyl, indane-2,5-diyl, bicyclooctylene or 1,4-cyclohexylene wherein one or two non-adjacent CH$_2$ groups are optionally replaced by O and/or S, wherein these groups are unsubstituted or substituted by 1, 2, 3 or 4 groups L as defined above.

Preferred RMs of formula I are selected of formula Ia

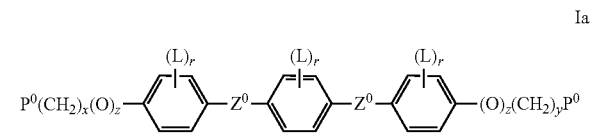

wherein $P^0$ is, in case of multiple occurrence independently of one another, a polymerisable group, preferably an acryl, methacryl, oxetane, epoxy, vinyl, vinyloxy, propenyl ether or styrene group, $Z^0$ is —COO—, —OCO—, —CH$_2$CH$_2$—, —CF$_2$O—, —OCF$_2$—, —C≡C—, —CH=CH—, —OCO—CH=CH—, —CH=CH—COO—, or a single bond, L has the meanings given in formula I and is preferably, in case of multiple occurrence independently of one another, selected from F, Cl, CN or optionally halogenated alkyl, alkoxy, alkylcarbonyl, alkoxycarbonyl, alkylcarbonyloxy or alkoxycarbonyloxy with 1 to 5 C atoms, r is 0, 1, 2, 3 or 4, x and y are independently of each other 0 or identical or different integers from 1 to 12, z is 0 or 1, with z being 0 if the adjacent x or y is 0.

Very preferred RMs of formula I are selected from the following formulae:
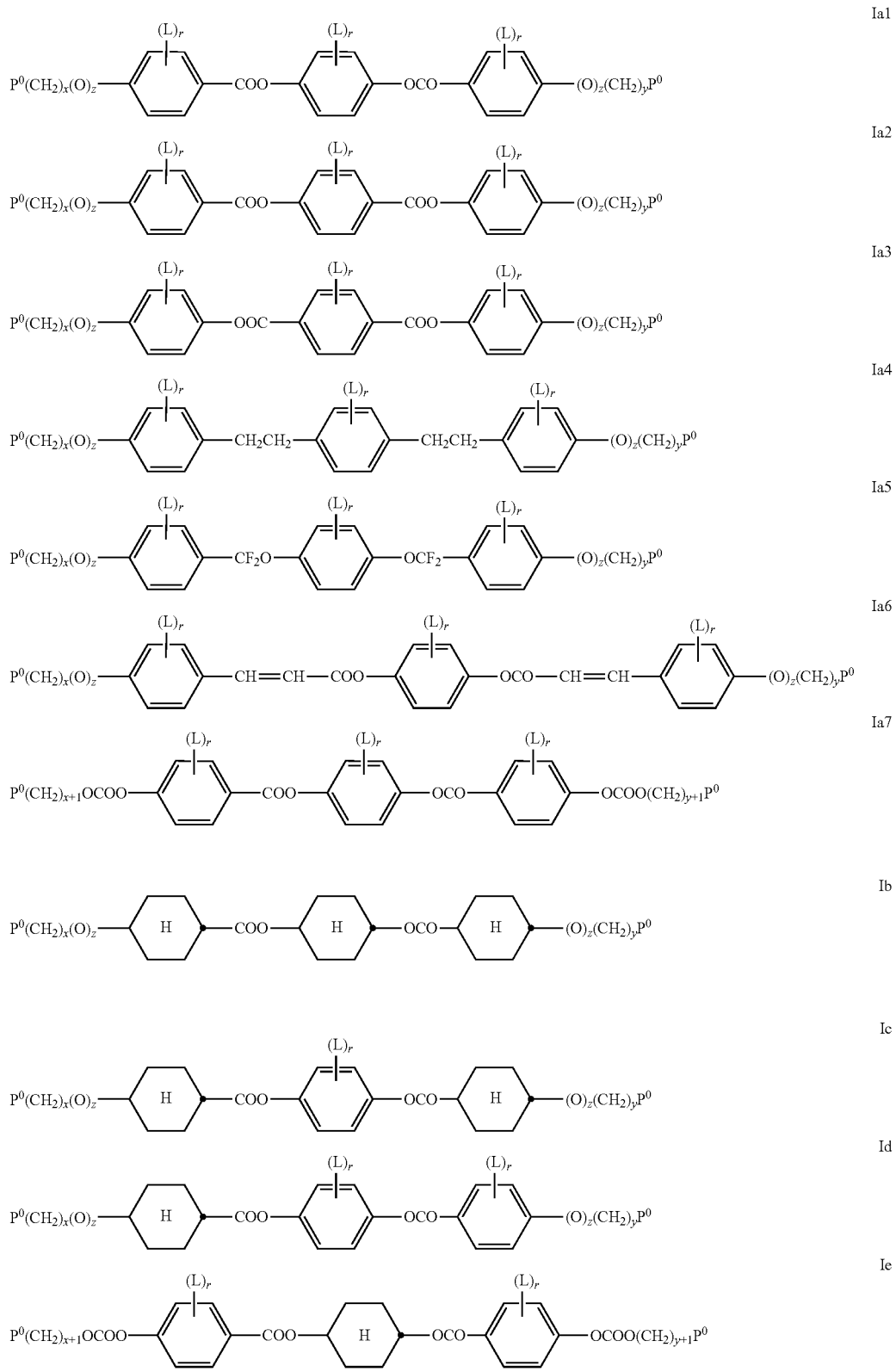
wherein $P^0$, L, r, x, y and z are as defined in formula Ia.

Especially preferred are compounds of formula Ia1, Ia2 and Ia3, in particular those of formula Ia1.

The concentration of di- or multireactive RMs, preferably those of formula I and its subformulae, in the RM formulation is preferably from 30% to 99.9%, very preferably from 50 to 80%.

The monoreactive RMs are preferably selected from formula Ill:

$$P^1\text{-}Sp^1\text{-}MG\text{-}R \qquad \qquad III$$

wherein $P^1$, $Sp^1$ and MG have the meanings given in formula I and II,

R denotes P-Sp-, F, Cl, Br, I, —CN, —NO$_2$, —NCO, —NCS, —OCN, —SCN, —C(=O)NR$^{00}$R$^{000}$, —C(=O)X, —C(=O)OR$^0$, —C(=O)R$^{00}$, —NR$^{00}$R$^{000}$, —OH, —SF$_5$, optionally substituted silyl, straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, X is halogen, preferably F or Cl, and R$^{00}$ and R$^{000}$ are independently of each other H or alkyl with 1 to 12 C-atoms.

Preferably the RMs of formula II are selected from the following formulae.

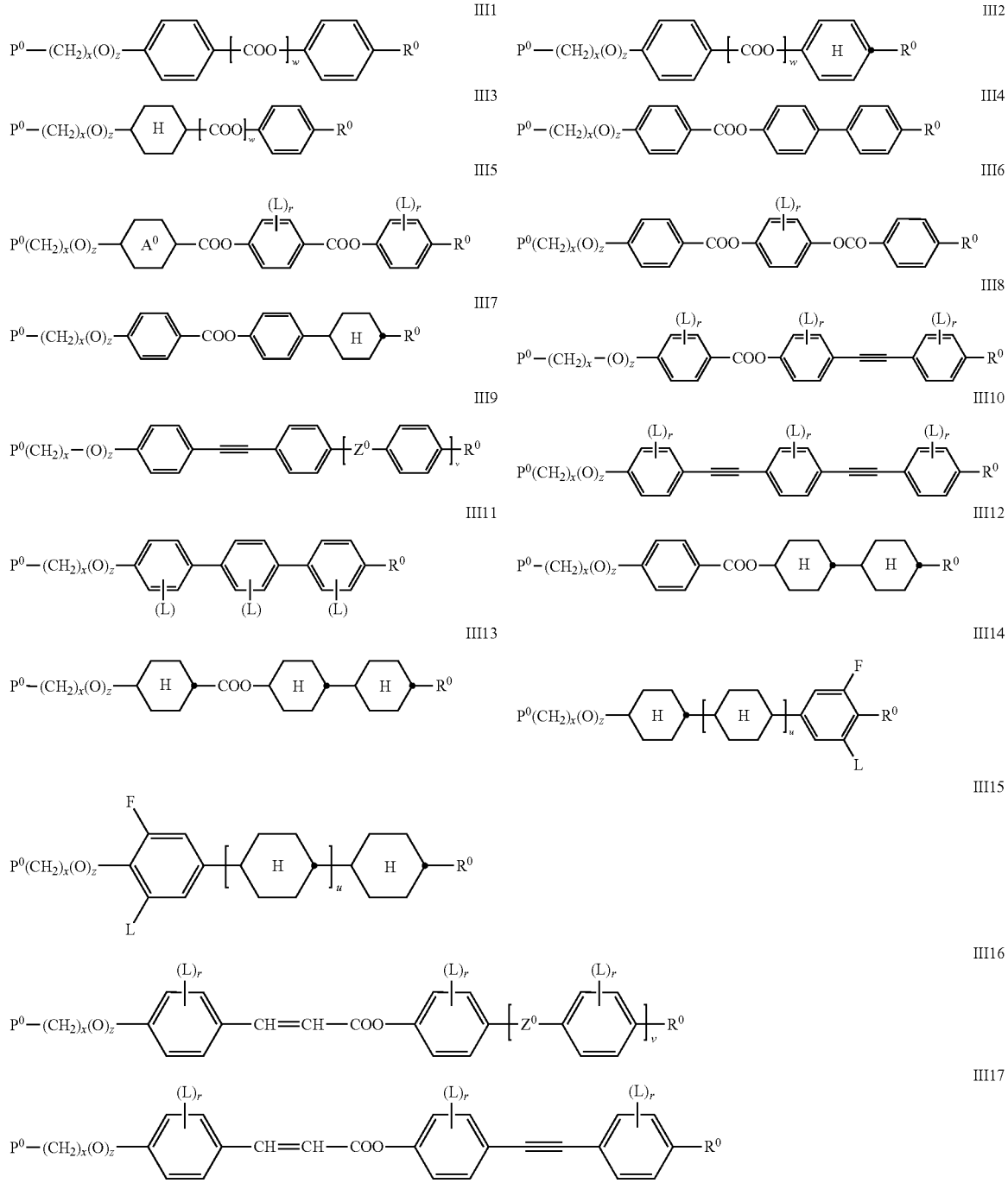

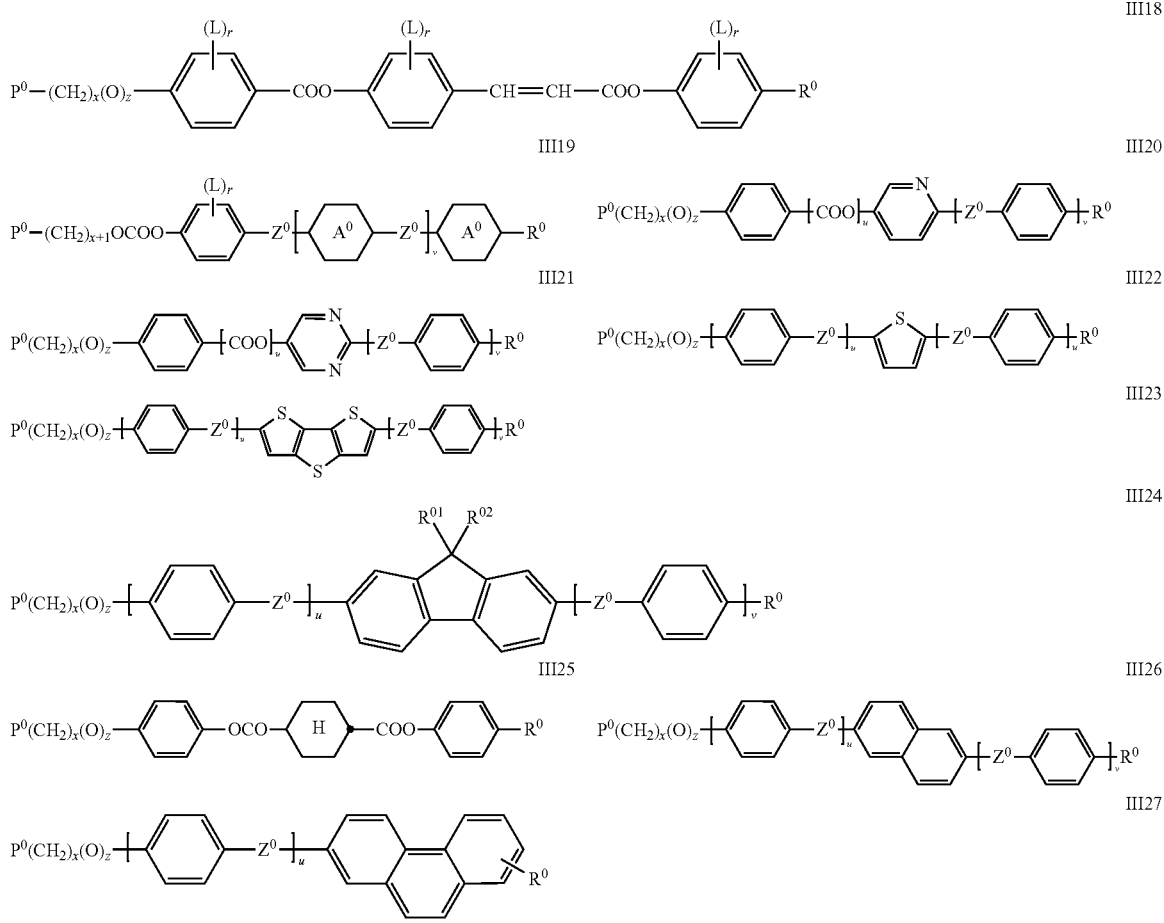

wherein $P^0$, L, r, x, y and z are as defined in formula Ia,
$R^0$ is alkyl, alkoxy, thioalkyl, alkylcarbonyl, alkoxycarbonyl, alkylcarbonyloxy or alkoxycarbonyloxy with 1 or more, preferably 1 to 15 C atoms which is optionally fluorinated, or denotes $Y^0$ or $P—(CH_2)_y—(O)_z—$,
$X^0$ is —O—, —S—, —CO—, —COO—, —OCO—, —O—COO—, —CO—NR$^{01}$—, —NR$^{01}$—CO—, —NR$^{01}$—CO—NR$^{01}$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^{01}$—, —CF=CF—, —C≡C—, —CH=CH—COO—, —OCO—CH=CH— or a single bond
$Y^0$ is F, Cl, CN, NO$_2$, OCH$_3$, OCN, SCN, SF$_5$, optionally fluorinated alkylcarbonyl, alkoxycarbonyl, alkylcarbonyloxy or alkoxycarbonyloxy with 1 to 4 C atoms, or mono- oligo- or polyfluorinated alkyl or alkoxy with 1 to 4 C atoms,
$A^0$ is, in case of multiple occurrence independently of one another, 1,4-phenylene that is unsubstituted or substituted with 1, 2, 3 or 4 groups L, or trans-1,4-cyclohexylene,
$R^{01,02}$ are independently of each other H, $R^0$ or $Y^0$,
u and v are independently of each other 0, 1 or 2,
w is 0 or 1,
and wherein the benzene and napthalene rings can additionally be substituted with one or more identical or different groups L.

Especially preferred are compounds of formula III1, III2, III3, III4, III5, III6, III7, III8, III9 and III10, in particular those of formula III1, III4, III6, III7 and III8.

The concentration of the monoreactive RMs in the RM formulation is preferably from 1 to 90%, very preferably from 10 to 70%.

The polymer film according to the present invention is preferably prepared by providing the RM formulation onto a substrate, aligning the RMs in the formulation into planar alignment (i.e. with the long molecular axes of the RMs and LC molecules aligned parallel to the substrate), and polymerising the RM formulation in its LC phase at a selected temperature, for example by exposure to heat or actinic radiation, preferably by photopolymerisation, very preferably by UV-photopolymerisation, to fix the alignment of the LC molecules.

Polymerisation of the RM formulation is preferably carried out in the presence of an initiator absorbing at the wavelength of the actinic radiation. For this purpose, preferably the RM formulation additionally contains one or more polymerisation initiators.

For example, when polymerising by means of UV light, a photoinitiator can be used that decomposes under UV irradiation to produce free radicals or ions that start the polymerisation reaction. For polymerising acrylate or methacrylate groups preferably a radical photoinitiator is used. For polymerising vinyl, epoxide or oxetane groups preferably a cationic photoinitiator is used. It is also possible to use a thermal polymerisation initiator that decomposes when heated to produce free radicals or ions that start the polymerisation. Typical radical photoinitiators are for example the commercially available Irgacure® or Darocure® (Ciba AG). for example Irgacure 651, Irgacure 907 or Irgacure 369. A typical cationic photoinitiator is for example UVI 6974 (Union Carbide).

The concentration of the polymerisation initiator in the RM formulation is preferably from 0.01 to 5%, very preferably from 0.1 to 3.

In another preferred embodiment of the present invention the RM formulation additionally contains one or more surfactants. The surfactants are selected such that they to promote planar surface alignment of the LC molecules when preparing the polymer film. Suitable surfactants are described for example in J. Cognard, Mol. Cryst. Liq. Cryst. 78, Supplement 1, 1-77 (1981).

Especially preferred are non-ionic surfactants, preferably polymerisable or unpolymerisable fluorocarbon surfactants, like for example Fluorad® FC-171 (from 3M Co.) or Zonyl FSN® (from DuPont), or Fluorad® FX-13 or FX-14 (from 3M Co.).

The concentration of the surfactants in the RM formulation is preferably from 0.1 to 5%, very preferably from 0.1 to 1%.

Preferably the RM formulation comprises:
30 to 99.9% of polymerisable mesogenic compounds having two or more polymerisable functional groups,
0 to 90% polymerisable mesogenic compounds having only one polymerisable functional group,
0.01 to 5% of one or more conductive additives,
0 to 5% of one or more surfactants,
0 to 5% of one or more polymerisation initiators.

Very preferably the RM formulation invention comprises:
50 to 80% of polymerisable mesogenic compounds having two or more polymerisable functional groups,
10 to 70% polymerisable mesogenic compounds having only one polymerisable functional group,
0.1 to 1% of one or more conductive additives,
0.1 to 1% of one or more surfactants,
0.1 to 3% of one or more polymerisation initiators.

The RM formulation may also comprise one or more monoreactive polymerisable non-mesogenic compounds, preferably in an amount of 0 to 30%, very preferably 0 to 15%. Typical examples are alkylacrylates or alkylmethacrylates.

The RM formulation may also comprise one or more di- or multireactive polymerisable non-mesogenic compounds, preferably in an amount of 0 to 30%, very preferably 0 to 15%, alternatively or in addition to the di- or multireactive polymerisable mesogenic compounds. Typical examples of direactive non-mesogenic compounds are alkyldiacrylates or alkyldimethacrylates with alkyl groups of 1 to 20 C atoms. Typical examples of multireactive non-mesogenic compounds are tri methylpropanetrimethacrylate or pentaerythritoltetraacrylate.

The RM formulation may also comprise a polymeric binder or one or more monomers capable of forming a polymeric binder, and/or one or more dispersion auxiliaries. Suitable binders and dispersion auxiliaries are disclosed for example in WO 96/02597. Preferably, however, the RM formulation does not contain a binder or dispersion auxiliary.

The RM formulation can additionally comprise one or more additives like for example catalysts, sensitizers, stabilizers, inhibitors, chain-transfer agents, co-reacting monomers, surface-active compounds, lubricating agents, wetting agents, dispersing agents, hydrophobing agents, adhesive agents, flow improvers, degassing or defoaming agents, deaerators, diluents, reactive diluents, auxiliaries, colourants, dyes, pigments or nanoparticles.

The RM formulation preferably exhibits a nematic LC phase, very preferably a nematic at room temperature, or a smectic phase and a nematic phase.

Preferably the RM formulation further comprises one or more organic solvents. The solvents are preferably selected from ketones such as acetone, methyl ethyl ketone, methyl propyl ketone, methyl isobutyl ketone or cyclohexanone; acetates such as methyl, ethyl or butyl acetate or methyl acetoacetate; alcohols such as methanol, ethanol or isopropyl alcohol; aromatic solvents such as toluene or xylene; alicyclic hydrocarbons such as cyclopentane or cyclohexane; halogenated hydrocarbons such as di- or trichloromethane; glycols or their esters such as PGMEA (propyl glycol monomethyl ether acetate), γ-butyrolactone.

It is also possible to use binary, ternary or higher mixtures of the above solvents.

In case the RM formulation contains one or more solvents, the total concentration of all solids, including the RMs, in the solvent(s) is preferably from 10 to 60%.

In formulae 1, 2, I, II, III and their preferred subformulae, L is preferably selected from F, Cl, CN, $NO_2$ or straight chain or branched alkyl, alkoxy, alkylcarbonyl, alkoxycarbonyl, alkylcarbonyloxy or alkoxycarbonyloxy with 1 to 12 C atoms, wherein the alkyl groups are optionally perfluorinated, or P-Sp-.

Very preferably L is selected from F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, in particular F, Cl, CN, $CH_3$, $C_2H_5$, $C(CH_3)_3$, $CH(CH_3)_2$, $OCH_3$, $COCH_3$ or $OCF_3$, most preferably F, Cl, $CH_3$, $C(CH_3)_3$, $OCH_3$ or $COCH_3$, or P-Sp-.

A substituted benzene ring of the formula

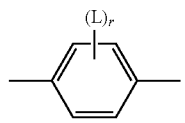

is preferably

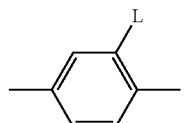 , 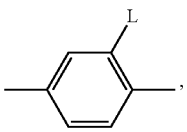 ,

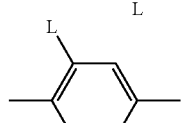 or 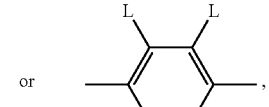 , with L having each independently one of the meanings given above.

In formulae 1, 2, I, II, III and their preferred subformulae, an alkyl or alkoxy radical, i.e. where the terminal $CH_2$ group is replaced by —O—, can be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, nonoxy, decoxy, undecoxy, dodecoxy, tridecoxy or tetradecoxy, for example.

Oxaalkyl, i.e. where one $CH_2$ group is replaced by —O—, is preferably straight-chain 2-oxapropyl (=methoxymethyl), 2-(=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8- or 9-oxadecyl, for example.

An alkyl group wherein one or more $CH_2$ groups are replaced by —CH=CH— can be straight-chain or branched. It is preferably straight-chain, has 2 to 10 C atoms and accordingly is preferably vinyl, prop-1-, or prop-2-enyl, but-1-, 2- or but-3-enyl, pent-1-, 2-, 3- or pent-4-enyl, hex-1-, 2-, 3-, 4- or hex-5-enyl, hept-1-, 2-, 3-, 4-, 5- or hept-6-enyl, oct-1-, 2-, 3-, 4-, 5-, 6- or oct-7-enyl, non-1-, 2-, 3-, 4-, 5-, 6-, 7- or non-8-enyl, dec-1-, 2-, 3-, 4-, 5-, 6-, 7-, 8- or dec-9-enyl.

Especially preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples for particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 C atoms are generally preferred.

In an alkyl group wherein one $CH_2$ group is replaced by —O— and one by —CO—, these radicals are preferably neighboured. Accordingly these radicals together form a carbonyloxy group —CO—O— or an oxycarbonyl group —O—CO—. Preferably this group is straight-chain and has 2 to 6 C atoms. It is accordingly preferably acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxyethyl, 2-butyryloxyethyl, 3-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxy-carbonylmethyl, propoxycarbonylmethyl, butoxycarbonylmethyl, 2-(methoxycarbonyl)ethyl, 2-(ethoxycarbonyl)ethyl, 2-(propoxy-carbonyl)ethyl, 3-(methoxycarbonyl)propyl, 3-(ethoxycarbonyl)propyl, 4-(methoxycarbonyl)-butyl.

An alkyl group wherein two or more $CH_2$ groups are replaced by —O— and/or —COO— can be straight-chain or branched. It is preferably straight-chain and has 3 to 12 C atoms. Accordingly it is preferably bis-carboxy-methyl, 2,2-bis-carboxy-ethyl, 3,3-bis-carboxy-propyl, 4,4-bis-carboxy-butyl, 5,5-bis-carboxy-pentyl, 6,6-bis-carboxy-hexyl, 7,7-bis-carboxy-heptyl, 8,8-bis-carboxy-octyl, 9,9-bis-carboxy-nonyl, 10,10-bis-carboxy-decyl, bis-(methoxycarbonyl)-methyl, 2,2-bis-(methoxycarbonyl)-ethyl, 3,3-bis-(methoxycarbonyl)-propyl, 4,4-bis-(methoxycarbonyl)-butyl, 5,5-bis-(methoxycarbonyl)-pentyl, 6,6-bis-(methoxycarbonyl)-hexyl, 7,7-bis-(methoxycarbonyl)-heptyl, 8,8-bis-(methoxycarbonyl)-octyl, bis-(ethoxycarbonyl)-methyl, 2,2-bis-(ethoxycarbonyl)-ethyl, 3,3-bis-(ethoxycarbonyl)-propyl, 4,4-bis-(ethoxycarbonyl)-butyl, 5,5-bis-(ethoxycarbonyl)-hexyl.

An alkyl or alkenyl group that is monosubstituted by CN or $CF_3$ is preferably straight-chain. The substitution by CN or $CF_3$ can be in any desired position.

An alkyl or alkenyl group that is at least monosubstituted by halogen is preferably straight-chain. Halogen is preferably F or Cl, in case of multiple substitution preferably F. The resulting groups include also perfluorinated groups. In case of monosubstitution the F or Cl substituent can be in any desired position, but is preferably in ω-position. Examples for especially preferred straight-chain groups with a terminal F substituent are fluoromethyl, 2-fluoroethyl, 3-fluoropropyl, 4-fluorobutyl, 5-fluoropentyl, 6-fluorohexyl and 7-fluoroheptyl. Other positions of F are, however, not excluded.

$R^{00}$ and $R^{000}$ are preferably selected from H, straight-chain or branched alkyl with 1 to 12 C atoms.

—$CY^1$=$CY^2$— is preferably —CH=CH—, —CF=CF— or —CH=C(CN)—.

Halogen is F, Cl, Br or I, preferably F or Cl.

R, $R^0$, $R^1$ and $R^2$ can be an achiral or a chiral group. Particularly preferred chiral groups are 2-butyl (=1-methylpropyl), 2-methylbutyl, 2-methylpentyl, 3-methylpentyl, 2-ethylhexyl, 2-propylpentyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-hexyl, 2-octyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, 1,1,1-trifluoro-2-octyloxy, 1,1,1-trifluoro-2-octyl, 2-fluoromethyloctyloxy for example. Very preferred are 2-hexyl, 2-octyl, 2-octyloxy, 1,1,1-trifluoro-2-hexyl, 1,1,1-trifluoro-2-octyl and 1,1,1-trifluoro-2-octyloxy.

Preferred achiral branched groups are isopropyl, isobutyl (=methylpropyl), isopentyl (=3-methylbutyl), isopropoxy, 2-methyl-propoxy and 3-methylbutoxy.

In formulae 1, 2, I, II, III and their preferred subformulae, the polymerisable groups $P^1$, $P^2$ and $P^0$ denote a group that is capable of participating in a polymerisation reaction, like radical or ionic chain polymerisation, polyaddition or polycondensation, or capable of being grafted, for example by condensation or addition, to a polymer backbone in a polymer analogous reaction. Especially preferred are polymerisable groups for chain polymerisation reactions, like radical, cationic or anionic polymerisation. Very preferred are polymerisable groups comprising a C—C double or triple bond, and polymerisable groups capable of polymerisation by a ring-opening reaction, like oxetanes or epoxides.

Suitable and preferred polymerisable groups $P^1$, $P^2$ and $P^0$ include, without limitation, $CH_2$=$CW^1$—COO—, $CH_2$=$CW^1$—CO—,

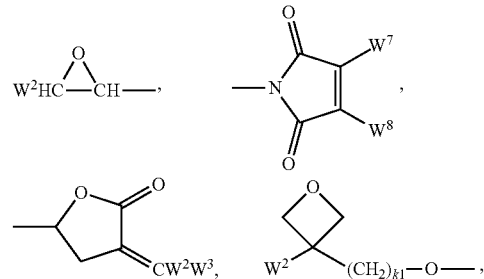

$CH_2=CW^2-(O)_{k1}-$, $CH_3-CH=CH-O-$, $(CH_2=CH)_2CH-OCO-$, $(CH_2=CH-CH_2)_2CH-OCO-$, $(CH_2=CH)_2CH-O-$, $(CH_2=CH-CH_2)_2N-$, $(CH_2=CH-CH_2)_2N-CO-$, $HO-CW^2W^3-$, $HS-CW^2W^3-$, $HW^2N-$, $HO-CW^2W^3-NH-$, $CH_2=CW^1-CO-NH-$, $CH_2=CH-(COO)_{k1}$-Phe-$(O)_{k2}-$, $CH_2=CH-(CO)_{k1}$-Phe-$(O)_{k2}-$, Phe-$CH=CH-$, $HOOC-$, $OCN-$, and $W^4W^5W^6Si-$, with $W^1$ being H, F, Cl, CN, $CF_3$, phenyl or alkyl with 1 to 5 C-atoms, in particular H, Cl or $CH_3$, $W^2$ and $W^3$ being independently of each other H or alkyl with 1 to 5 C-atoms, in particular H, methyl, ethyl or n-propyl, $W^4$, $W^5$ and $W^6$ being independently of each other Cl, oxaalkyl or oxacarbonylalkyl with 1 to 5 C-atoms, $W^7$ and $W^8$ being independently of each other H, Cl or alkyl with 1 to 5 C-atoms, Phe being 1,4-phenylene that is optionally substituted, preferably by one or more groups L as defined above (except for the meaning P-Sp-), and $k_1$ and $k_2$ being independently of each other 0 or 1.

Very preferred polymerisable groups $P^1$, $P^2$ and $P^0$ are selected from $CH_2=CW^1-COO-$, $CH_2=CW^1-CO-$,

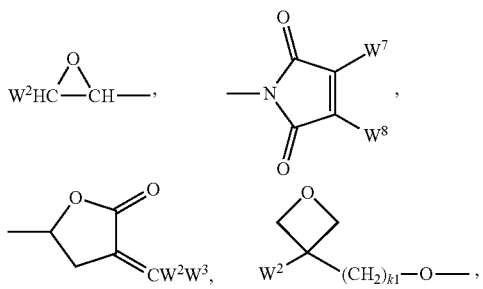

$(CH_2=CH)_2CH-OCO-$, $(CH_2=CH-CH_2)_2CH-OCO-$, $(CH_2=CH)_2CH-O-$, $(CH_2=CH-CH_2)_2N-$, $(CH_2=CH-CH_2)_2N-CO-$, $HO-CW^2W^3-$, $HS-CW^2W^3-$, $HW^2N-$, $HO-CW^2W^3-NH-$, $CH_2=CW^1-CO-NH-$, $CH_2=CH-(COO)_{k1}$-Phe-$(O)_{k2}-$, $CH_2=CH-(CO)_{k1}$-Phe-$(O)_{k2}-$, Phe-$CH=CH-$, $HOOC-$, $OCN-$, and $W^4W^5W^6Si-$, with $W^1$ being H, F, Cl, CN, $CF_3$, phenyl or alkyl with 1 to 5 C-atoms, in particular H, F, Cl or $CH_3$, $W^2$ and $W^3$ being independently of each other H or alkyl with 1 to 5 C-atoms, in particular H, methyl, ethyl or n-propyl, $W^4$, $W^5$ and $W^6$ being independently of each other Cl, oxaalkyl or oxacarbonylalkyl with 1 to 5 C-atoms, $W^7$ and $W^8$ being independently of each other H, Cl or alkyl with 1 to 5 C-atoms, Phe being 1,4-phenylene that is optionally substituted preferably by one or more groups L as defined above (except for the meaning P-Sp-), and $k_1$ and $k_2$ being independently of each other 0 or 1.

Most preferred polymerisable groups $P^1$, $P^2$ and $P^0$ are selected from $CH_2=CH-COO-$, $CH_2=C(CH_3)-COO-$, $CH_2=CF-COO-$, $(CH_2=CH)_2CH-OCO-$, $(CH_2=CH)_2CH-O-$,

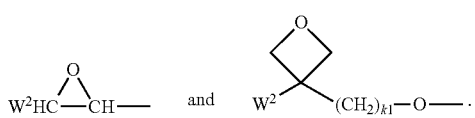

Polymerisation can be carried out according to methods that are known to the ordinary expert and described in the literature, for example in D. J. Broer; G. Challa; G. N. Mol, *Macromol. Chem,* 1991, 192, 59.

In formulae 1, 2, I, II, III and their preferred subformulae, the spacer groups Sp, $Sp^1$ and $Sp^2$ are preferably selected of formula Sp'-X', such that e.g. P-Sp- is P-Sp'-X'—, wherein Sp' is alkylene with 1 to 20 C atoms, preferably 1 to 12 C-atoms, which is optionally mono- or polysubstituted by F, Cl, Br, I or CN, and wherein one or more non-adjacent $CH_2$ groups are optionally replaced, in each case independently from one another, by $-O-$, $-S-$, $-NH-$, $-NR^0-$, $-SiR^0R^{00}-$, $-CO-$, $-COO-$, $-OCO-$, $-OCO-O-$, $-S-CO-$, $-CO-S-$, $-NR^0-CO-O-$, $-O-CO-NR^0-$, $-NR^0-CO-NR^0-$, $-CH=CH-$ or $-C\equiv C-$ in such a manner that O and/or S atoms are not linked directly to one another, X' is $-O-$, $-S-$, $-CO-$, $-COO-$, $-OCO-$, $-O-COO-$, $-CO-NR^0-$, $-NR^0-CO-$, $-NR^0-CO-NR^0-$, $-OCH_2-$, $-CH_2O-$, $-SCH_2-$, $-CH_2S-$, $-CF_2O-$, $-OCF_2-$, $-CF_2S-$, $-SCF_2-$, $-CF_2CH_2-$, $-CH_2CF_2-$, $-CF_2CF_2-$, $-CH=N-$, $-N=CH-$, $-N=N-$, $-CH=CR^0-$, $-CY^1=CY^2-$, $-C\equiv C-$, $-CH=CH-COO-$, $-OCO-CH=CH-$ or a single bond, $R^0$ and $R^{00}$ are independently of each other H or alkyl with 1 to 12 C-atoms, and $Y^1$ and $Y^2$ are independently of each other H, F, Cl or CN.

X' is preferably $-O-$, $-S-CO-$, $-COO-$, $-OCO-$, $-O-COO-$, $-CO-NR^0-$, $-NR^0-CO-$, $-NR^0-CO-NR^0-$ or a single bond.

Typical groups Sp' are, for example, $-(CH_2)_{p1}-$, $-(CH_2CH_2O)_{q1}-CH_2CH_2-$, $-CH_2CH_2-S-CH_2CH_2-$ or $-CH_2CH_2-NH-CH_2CH_2-$ or $-(SiR^0R^{00}-O)_{p1}-$, with p1 being an integer from 2 to 12, q1 being an integer from 1 to 3 and $R^0$ and $R^{00}$ having the meanings given above.

Preferred groups Sp' are ethylene, propylene, butylene, pentylene, hexylene, heptylene, octylene, nonylene, decylene, undecylene, dodecylene, octadecylene, ethyleneoxyethylene, methyleneoxy-butylene, ethylene-thioethylene, ethylene-N-methyl-iminoethylene, 1-methylalkylene, ethenylene, propenylene and butenylene for example.

Further preferred are compounds wherein the polymerisable group is directly attached to the mesogenic group without a spacer group Sp.

In case of compounds with two or more groups $P^1$-$Sp^1$- etc., the polymerisable groups $P^1$ and the spacer groups $Sp^1$ can be identical or different.

In another preferred embodiment the reactive compounds comprise one or more terminal groups $R^{0,1,2}$ or substituents L that are substituted by two or more polymerisable groups P or P-Sp- (multifunctional polymerisable groups). Suitable multifunctional polymerisable groups of this type are disclosed for example in U.S. Pat. No. 7,060,200 B1 oder US 2006/0172090 A1. Very preferred are compounds comprising one or more multifunctional polymerisable groups selected from the following formulae:

| | |
|---|---|
| —X-alkyl-$CHP^1$—$CH_2$—$CH_2P^2$ | P1 |
| —X'-alkyl-$C(CH_2P^1)(CH_2P^2)$—$CH_2P^3$ | P2 |
| —X'-alkyl-$CHP^1CHP^2$—$CH_2P^3$ | P3 |
| —X'-alkyl-$C(CH_2P^1)(CH_2P^2)$—$C_{aa}H_{2aa+1}$ | P4 |
| —X'-alkyl-$CHP^1$—$CH_2P^2$ | P5 |
| —X'-alkyl-$CHP^1P^2$ | P5 |

—X'-alkyl-CP¹P²—C$_{aa}$H$_{2aa+1}$  P6

—X'-alkyl-C(CH$_2$P¹)(CH$_2$P²)—CH$_2$OCH$_2$—C(CH$_2$P³)(CH$_2$P⁴)CH$_2$P⁵  P7

—X'-alkyl-CH((CH$_2$)$_{aa}$P¹)((CH$_2$)$_{bb}$P²)  P8

—X'-alkyl-CHP¹CHP²—C$_{aa}$H$_{2aa+1}$  P9 wherein
alkyl is straight-chain or branched alkylene having 1 to 12 C-atoms which is unsubstituted, mono- or polysubstituted by F, Cl, Br, I or CN, and wherein one or more non-adjacent CH$_2$ groups are optionally replaced, in each case independently from one another, by —O—, —S—, —NH—, —NR⁰—, —SiR⁰R⁰⁰—, —CO—, —COO—, —OCO—, —O—CO—O—, —S—CO—, —CO—S—, —SO$_2$—, —CO—NR⁰—, —NR⁰—CO—, —NR⁰—CO—NR⁰⁰—, —CY¹=CY²— or —C≡C— in such a manner that O and/or S atoms are not linked directly to one another, with R⁰ and R⁰⁰ having the meanings given above, or denotes a single bond,
aa and bb are independently of each other 0, 1, 2, 3, 4, 5 or 6,
X' is as defined above, and
P$^{1-5}$ independently of each other have one of the meanings given for P above.

The preparation of polymer films according to this invention can be carried out by methods that are known to the skilled person and described in the literature, for example in D. J. Broer; G. Challa; G. N. Mol, *Macromol. Chem,* 1991, 192, 59. Typically the RM formulation is coated or otherwise applied onto a substrate where it aligns into uniform orientation, preferably planar alignment (i.e. with the long molecular axes of the calamitic RMs or LC molecules aligned parallel to the substrate), and polymerised in situ in its LC phase at a selected temperature for example by exposure to heat or actinic radiation, preferably by photopolymerisation, very preferably by UV-photopolymerisation, to fix the alignment of the LC molecules. If necessary, uniform alignment can promoted by additional means like shearing or annealing the LC material, surface treatment of the substrate, or adding surfactants to the LC material.

As substrate for example glass or quartz sheets or plastic films can be used. It is also possible to put a second substrate on top of the coated material prior to and/or during and/or after polymerisation. The substrates can be removed after polymerisation or not. When using two substrates in case of curing by actinic radiation, at least one substrate has to be transmissive for the actinic radiation used for the polymerisation. Isotropic or birefringent substrates can be used. In case the substrate is not removed from the polymerised film after polymerisation, preferably isotropic substrates are used.

Suitable and preferred plastic substrates are for example films of polyester such as polyethyleneterephthalate (PET) or polyethylene-naphthalate (PEN), polyvinylalcohol (PVA), polycarbonate (PC) or triacetylcellulose (TAC), very preferably PET or TAC films. As birefringent substrates for example uniaxially stretched plastics film can be used. PET films are commercially available for example from DuPont Teijin Films under the trade name Melinex®.

Preferably the RMs and the other solid additives are dissolved in a solvent. The solution is then coated or printed onto the substrate, for example by spin-coating or printing or other known techniques, and the solvent is evaporated off before polymerisation. In many cases it is suitable to heat the coated solution in order to facilitate the evaporation of the solvent.

The RM formulaion can be applied onto the substrate by conventional coating techniques like spin-coating or blade coating. It can also be applied to the substrate by conventional printing techniques which are known to the expert, like for example screen printing, offset printing, reel-to-reel printing, letter press printing, gravure printing, rotogravure printing, flexographic printing, intaglio printing, pad printing, heat-seal printing, inkjet printing or printing by means of a stamp or printing plate.

The RM formulation should preferably exhibit planar alignment. This can be achieved for example by rubbing treatment of the substrate, by shearing the material during or after coating, by annealing the material before polymerisation, by application of an alignment layer, by applying a magnetic or electric field to the coated material, or by the addition of surface-active compounds to the formulation. Reviews of alignment techniques are given for example by I. Sage in "Thermotropic Liquid Crystals", edited by G. W. Gray, John Wiley & Sons, 1987, pages 75-77; and by T. Uchida and H. Seki in "Liquid Crystals—Applications and Uses Vol. 3", edited by B. Bahadur, World Scientific Publishing, Singapore 1992, pages 1-63. A review of alignment materials and techniques is given by J. Cognard, Mol. Cryst. Liq. Cryst. 78, Supplement 1 (1981), pages 1-77.

It is also possible to apply an alignment layer onto the substrate and provide the RM formulation onto this alignment layer. Suitable alignment layers are known in the art, like for example rubbed polyimide or alignment layers prepared by photoalignment as described in U.S. Pat. No. 5,602,661, 5,389,698 or 6,717,644.

It is also possible to induce or improve alignment by annealing the RM formulation at elevated temperature, but below its clearing temperature, prior to polymerisation.

Polymerisation is achieved for example by exposing the polymerisable material to heat or actinic radiation. Actinic radiation means irradiation with light, like UV light, IR light or visible light, irradiation with X-rays or gamma rays or irradiation with high energy particles, such as ions or electrons. Preferably polymerisation is carried out by UV irradiation. As a source for actinic radiation for example a single UV lamp or a set of UV lamps can be used. When using a high lamp power the curing time can be reduced. Another possible source for actinic radiation is a laser, like for example a UV, IR or visible laser.

The curing time depends, inter alia, on the reactivity of the RM formulation, the thickness of the coated layer, the type of polymerisation initiator and the power of the UV lamp. The curing time is preferably ≤5 minutes, very preferably ≤3 minutes, most preferably ≤1 minute. For mass production short curing times of ≤30 seconds are preferred.

The polymerisation process is not limited to one curing step. It is also possible to carry out polymerisation by two or more steps, in which the film is exposed to two or more lamps of the same type, or two or more different lamps in sequence. The curing temperature of different curing steps might be the same or different. The lamp power and dose from different lamps might also be the same or different. In addition to the conditions described above, the process steps may also include a heat step between exposure to different lamps, as described for example in JP 2005-345982 A and JP 2005-265896 A.

Preferably polymerisation is carried out in air, but polymerising in an inert gas atmosphere like nitrogen or argon is also possible.

The thickness of a polymer film according to the present invention is preferably from 0.2 to 10 microns, very preferably from 0.3 to 5 microns, most preferably from 0.5 to 3 microns.

The polymer films and materials of the present invention can be used in optical, electrooptical or electronic devices ort components thereof. For example, they can be used in optical retardation films, polarizers, compensators, beam splitters, reflective films, alignment layers, colour filters, antistatic protection sheets, or electromagnetic interference protection sheets, polarization controlled lenses for autostereoscopic 3D displays, and IR reflection films for window applications.

The polymer films, materials and components can be used in devices is selected from electrooptical displays, especially liquid crystal displays (LCDs), autostereoscopic 3D displays, organic light emitting diodes (OLEDs), optical data storage devices, and window applications.

The polymer films and materials of the present invention can be used outside the switchable LC cell of an LCD or between the substrates, usually glass substrates, forming the switchable LC cell and containing the switchable LC medium (incell application).

The polymer film and materials of the present invention can be used in conventional LC displays, for example displays with vertical alignment like the DAP (deformation of aligned phases), ECB (electrically controlled birefringence), CSH (colour super homeotropic), VA (vertically aligned), VAN or VAC (vertically aligned nematic or cholesteric), MVA (multi-domain vertically aligned), PVA (patterned vertically aligned) or PSVA (polymer stabilised vertically aligned) mode; displays with bend or hybrid alignment like the OCB (optically compensated bend cell or optically compensated birefringence), R-OCB (reflective OCB), HAN (hybrid aligned nematic) or pi-cell (π-cell) mode; displays with twisted alignment like the TN (twisted nematic), HTN (highly twisted nematic), STN (super twisted nematic), AMD-TN (active matrix driven TN) mode; displays of the IPS (in plane switching) mode, or displays with switching in an optically isotropic phase.

The polymer films of the present invention can be used for various types of optical films, like twisted optical retarders, reflective polarisers and brightness enhancement films.

The invention also relates to an RM formulation as described above and below, which has increased electrical conductivity and decreased electrical resistivity, preferably a resistivity≤1E06 Ω·m, very preferably ≤7E05 Ω·m and a conductivity≥1E-06 S/m, very preferably ≥1.2E68 S/m.

The invention also relates to a polymer film with reduced (electrical) sheet resistance, which comprises or consists of a polymerised RM formulation as described above and below, or is obtained by polymerising a layer of an RM formulation as described above and below, preferably wherein the RMs are aligned, and preferably at a temperature where the RM formulation exhibits a liquid crystal phase.

One preferred embodiment relates to polymer films having a sheet resistance<10,000 Ω/sq. Such films are especially suitable for example as antistatic protection sheets. Another preferred embodiment relates to polymer films having a sheet resistance<50 Ω/sq, very preferably <5 Ω/sq. Such films are suitable for example as electromagnetic interference protection sheets. The sheet resistance can be measured by the four point probe method or Van der Pauw method, which is described in the literature.

The thickness of a polymer film with reduced sheet resistance, including the above mentioned preferred embodiments, is preferably from 0.2 to 5, very preferably from 0.5 to 3 microns.

Above and below, percentages are percent by weight unless stated otherwise. All temperatures are given in degrees Celsius. m.p. denotes melting point, cl.p. denotes clearing point, $T_g$ denotes glass transition temperature. Furthermore, C=crystalline state, N=nematic phase, S=smectic phase and I=isotropic phase. The data between these symbols represent the transition temperatures. Δn denotes the optical anisotropy or birefringence ($\Delta n = n_e - n_o$, where $n_o$ denotes the refractive index parallel to the longitudinal molecular axes and $n_e$ denotes the refractive index perpendicular thereto), measured at 589 nm and 20° C. The optical and electrooptical data are measured at 20° C., unless expressly stated otherwise. "Clearing point" and "clearing temperature" mean the temperature of the transition from an LC phase into the isotropic phase.

Unless stated otherwise, the percentages of components of a polymerisable formulation as given above and below refer to the total amount of solids in the formulation without any solvents.

Unless stated otherwise, all optical, electrooptical properties and physical parameters like birefringence, permittivity, electrical conductivity, electrical resistivity and sheet resistance, refer to a temperature of 20° C.

Unless the context clearly indicates otherwise, as used herein plural forms of the terms herein are to be construed as including the singular form and vice versa.

Throughout the description and claims of this specification, the words "comprise" and "contain" and variations of the words, for example "comprising" and "comprises", mean "including but not limited to", and are not intended to (and do not) exclude other components.

It will be appreciated that variations to the foregoing embodiments of the invention can be made while still falling within the scope of the invention. Each feature disclosed in this specification, unless stated otherwise, may be replaced by alternative features serving the same, equivalent or similar purpose. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

The following examples are intended to explain the invention without restricting it. The methods, structures and properties described hereinafter can also be applied or transferred to materials that are claimed in this invention but not explicitly described in the foregoing specification or in the examples.

Example 1

The RM formulation RMS1 is prepared as follows:

| Compound | Concentration (wt. %) |
|---|---|
| Methyl isobutyl ketone (MIBK) | 70.000% |
| Compound (1) | 7.083% |
| Compound (2) | 7.083% |
| Compound (3) | 11.346% |
| Compound (4) | 2.799% |
| Fluorad FC171 ® | 0.150% |
| Irgacure 907 ® | 1.515% |
| Irganox 1076 ® | 0.024% |

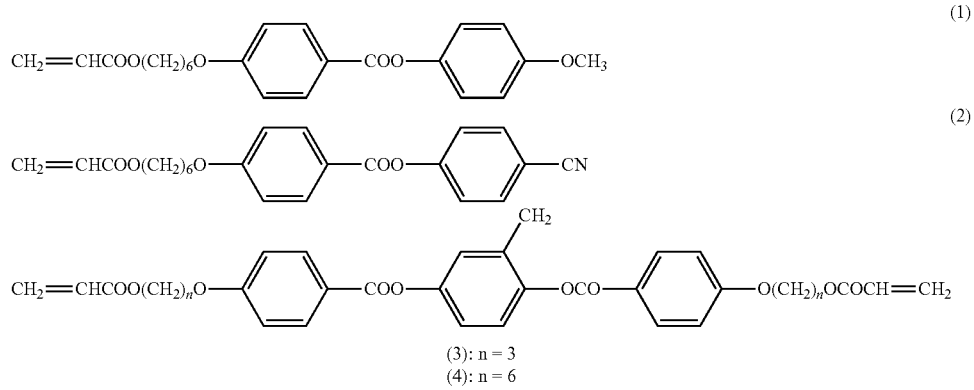

(1)
(2)
(3): n = 3
(4): n = 6

The following conductive additives are used:

| No. | CAS-No. | Name | Structure |
|---|---|---|---|
| CA1 | | MOTMA-NTF | |
| CA2 | 5039-78-1 | MOTMA-C | |
| CA3 | 6891-44-7 | MOTMA-MS | |
| CA4 | | H$_2$O | |
| CA5 | | Isopropyl-alcolhol | |
| CA6 | | Formula 2a1a | |

MOTMA-C and MOTMA-MS are available from Sigma-Aldrich. MOTMA-NTF was preared as described in Scheme 1 above.

The conductive additives are to the RM formulation either alone or in combination with each other, for example, by combining additive CA2 with additive CA4, or combining additive CA3 with additive CA4.

Conductivity Measurements

The effect of solvent type and additive concentration are investigated by measuring the electrical resistivity and conductivity, using a 1V applied voltage. The results are shown in Table 1 below.

TABLE 1

| Sample | RH % | Resistivity/ Ohm*cm | Conductivity/ S*cm$^{-1}$ |
|---|---|---|---|
| Toluene | 20 | 1.76E+13 | 5.70E−14 |
| PGMEA | 19 | 2.22E+08 | 4.50E−09 |
| Methyl ethyl ketone (MEK) | 19 | 1.64E+08 | 6.10E−09 |
| Methyl isobutyl ketone (MIBK) | 19 | 1.02E+08 | 9.85E−09 |
| RMS1 | 19 | 8.83E+07 | 1.13E−08 |
| RMS1 + 0.3% CA1 | 19 | 6.34E+07 | 1.58E−08 |
| RMS1 + 1% CA1 | 19 | 4.54E+07 | 2.20E−08 |
| RMS1 + 1% CA4 | 19 | 5.23E+07 | 1.91E−08 |

It can be seen that there is a significant variation of the resistivity and conductivity depending on the solvent type. The above RM formulation RMS1 (reactive mesogen mixture in MIBK, with 30% solids) has a higher conductivity than the pure base solvent MIBK. The addition of a small amount of water (CA4) or conductive additive CA1 (0.3-1% MOTA-NTF in this example) results in a significant increase in conductivity.

Example 2: Effect on RM Processing—Additive CA1

Additive CA1 is added in concentrations of 0.1, 0.5 and 1% to the formulation RMS1. The individual formulations with and without additive CA1 are coated on rubbed polyimide glass by spin coating (3000 rpm, 30 sec). This is followed by an annealing step (at 50° C. for 60 sec) to remove the solvent. The coatings are cooled to room temperature and then exposed to UV light from a high pressure mercury lamp (1200 mJ/cm$^2$), forming a polymerised film.

Optical properties of the film are measured by ellipsometry, with a rotating sample stage providing retardation values at angles of incidence from –40 to 40 degrees. The results are shown in FIG. 1 for the films prepared from RMS1 containing 0%, 0.1%, 0.5% and 1% of CA1. No effect of the additive on the optical properties of the films is observed. All films show the same retardation value and off-axis performance for each concentration of CA1.

Example 3: Effect on RM Processing—Additive CA2

Figure 2:
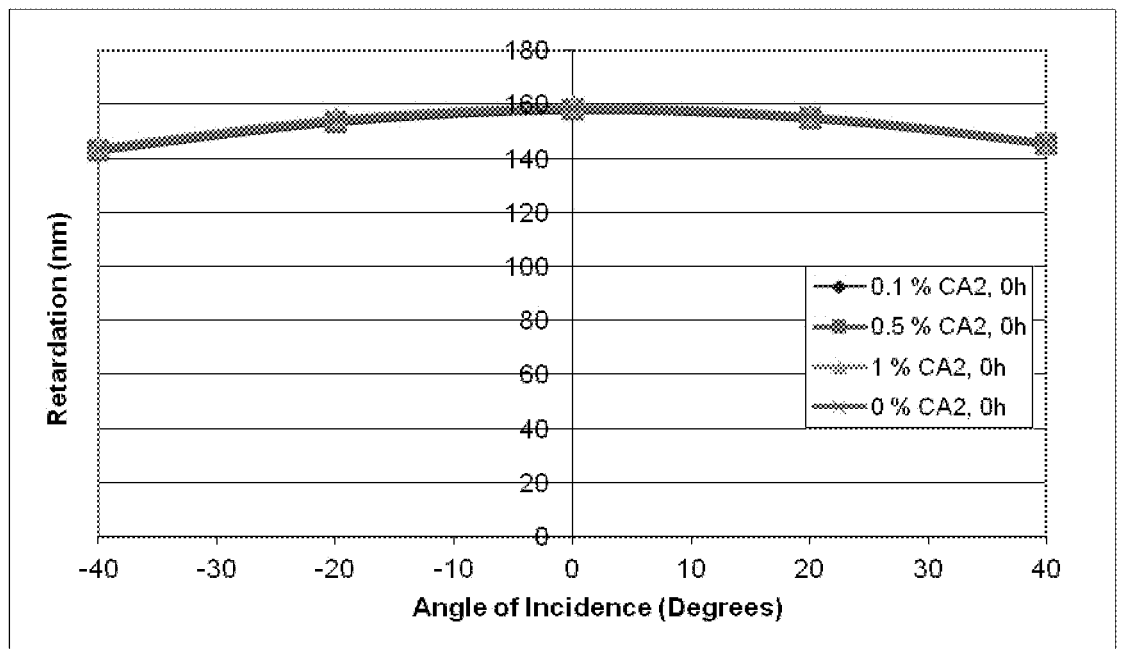
FIG. 2 shows the retardation versus viewing angle for polymer films prepared in accordance with example 3.

Polymerised RM films are prepared from RMS 1 without and with varying concentrations of additive CA2 as described above in Example 2, and their retardation values are measured by ellipsometry. The results are shown in FIG. 2. No effect of the additive on the processing or optical properties of the film is observed.

Example 4: Effect on Film Durability—Additive CA1, CA2, CA3

Figure 3:
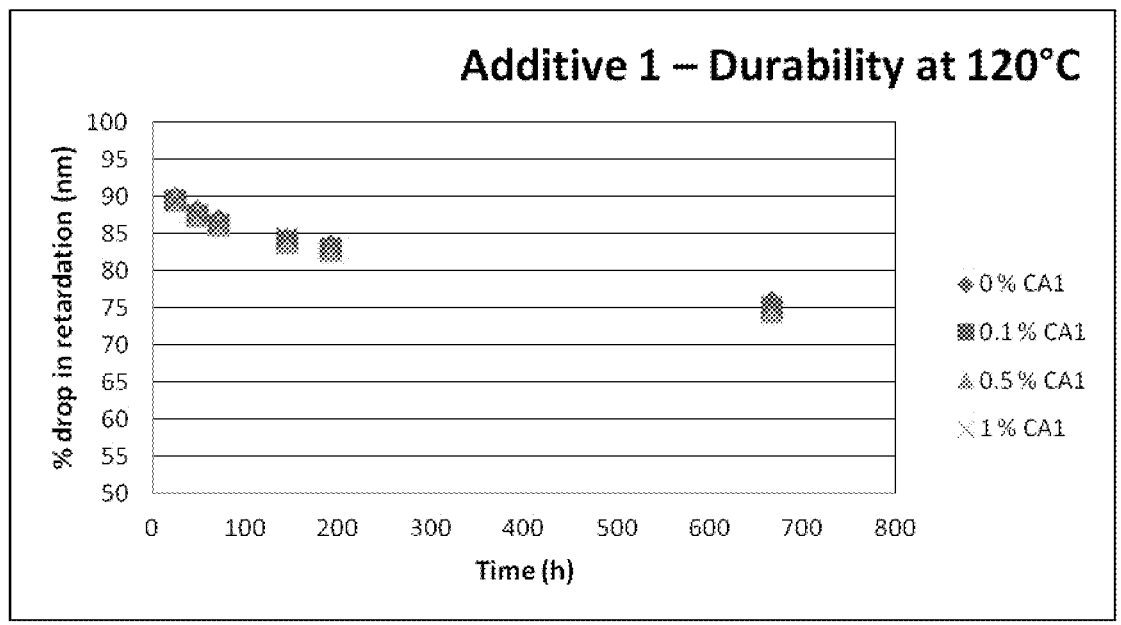
FIGS. 3, 4 and 5 show the retardation durability (retardation drop vs. temperature) for polymer films prepared in accordance with example 4.
Figure 4:
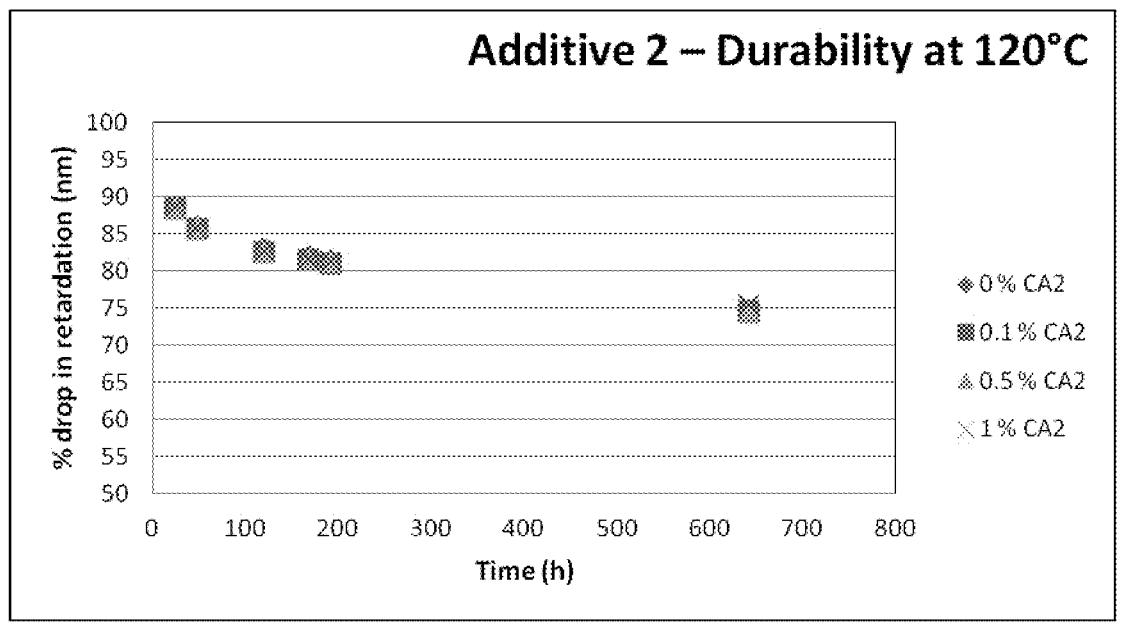
Figure 5:
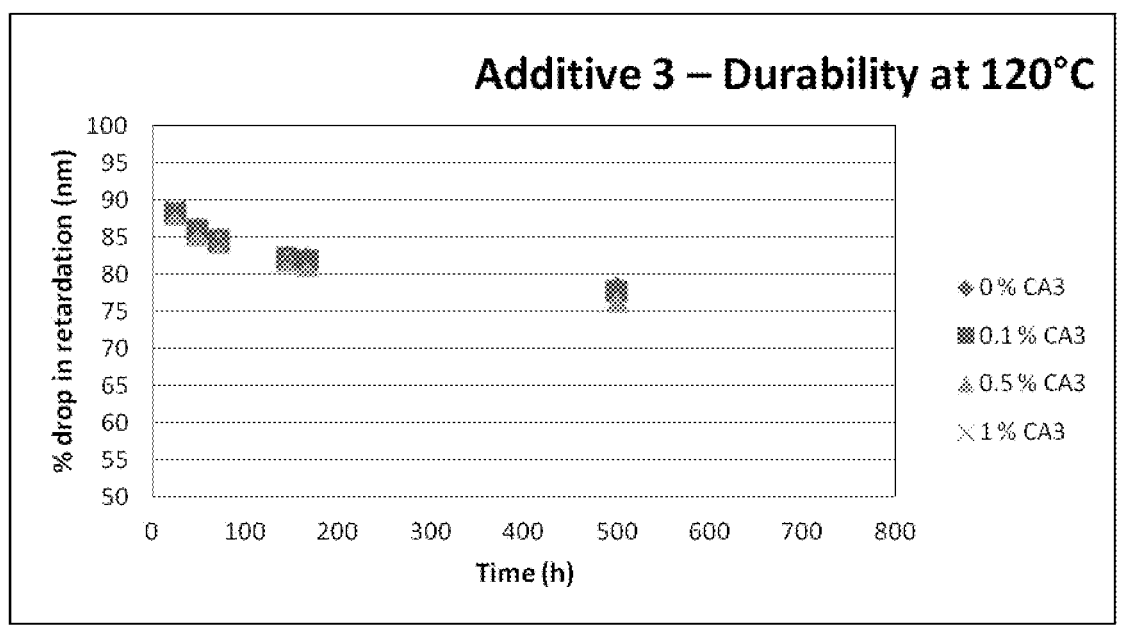

To investigate a possible effect of the additive on the film durability, RM film samples are prepared from RMS 1 without or with additive CA1, CA2 or CA3 in concentrations of 0.1%, 0.5% and 1%, respectively, by the method as described above. The film samples are then placed in a temperature chamber at 120° C. and their retardation is measured periodically by ellipsometry. The effect of the temperature treatment on the retardation of the films is shown in FIGS. 3, 4 and 5 for additive CA1, CA2 and CA3, respectively. It can be seen that the retardation drop due to exposure to high temperature is identical, within experimental error, for film samples with concentrations of the additive between 0-1%. The same trend was observed for each of additive CA1, CA2 and CA3.

The invention claimed is:

1. A formulation comprising >50% by weight of one or more polymerisable mesogenic compounds, and one or more conductive additives, wherein the conductive additives are selected from ionic organic compounds of the formula 1:

$$P^1\text{-Sp-}C^+A^- \qquad 1$$

wherein Sp is a spacer group or a single bond, $C^+$ is a cation, $A^-$ is an anion and $P^1$ is a polymerisable group selected from $CH_2=CW^1-COO^-$, $CH_2=CW^1-CO-$,

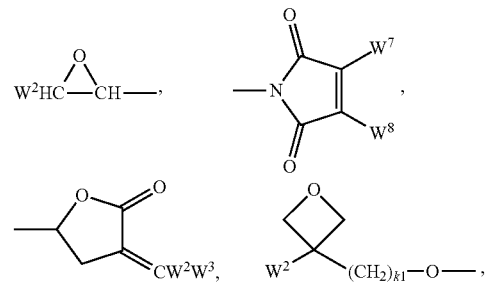

$CH_2=CW^2-(O)_{k1}-$, $CH_3-CH=CH-O-$, $(CH_2=CH)_2CH-OCO-$, $(CH_2=CH-CH_2)_2CH-OCO-$, $(CH_2=CH)_2CH-O-$, $(CH_2=CH-CH_2)_2N-$, $(CH_2=CH-CH_2)_2N-CO-$, $HO-CW^2W^3-$, $HS-CW^2W^3-$, $HW^2N-$, $HO-CW^2W^3-NH-$, $CH_2=CW^1-CO-NH-$, $CH_2=CH-(COO)_{k1}$-Phe-$(O)_{k2}-$, $CH_2=CH-(CO)_{k1}$-Phe-$(O)_{k2}-$, Phe-$CH=CH-$, $HOOC-$, $OCN-$ and $W^4W^5W^6Si-$, where:

$W^1$ is H, F, Cl, CN, CF$_3$, phenyl or alkyl with 1 to 5 C-atoms;

$W^2$ and $W^3$ are independently of each other H or alkyl with 1 to 5 C-atoms;

$W^4$, $W^5$ and $W^6$ are independently of each other Cl, oxaalkyl or oxacarbonylalkyl with 1 to 5 C-atoms;

$W^7$ and $W^8$ are independently of each other H, Cl or alkyl with 1 to 5 C-atoms, Phe is 1,4-phenylene that is optionally substituted by one or more groups L;

L is F, Cl, Br, I, —CN, —NO$_2$, —NCO, —NCS, —OCN, —SCN, —C(=O)NR$^{00}$R$^{000}$, —C(=O)X, —C(=O)OR$^{00}$, —C(=O)R$^0$, —NR$^{00}$R$^{000}$, —OH, —SF$_5$, optionally substituted silyl, aryl or heteroaryl with 1 to 12 C atoms, and straight chain or branched alkyl, alkoxy, alkylcarbonyl, alkoxycarbonyl, alkylcarbonyloxy or alkoxycarbonyloxy with 1 to 12 C atoms, wherein one or more H atoms are optionally replaced by F or Cl;

R$^{00}$ and R$^{000}$ independently of each other are H or alkyl with 1 to 12 C-atoms; and $k_1$ and $k_2$ are independently of each other 0 or 1.

2. A formulation according to claim 1, wherein the cation, $C^+$, in the conductive additive is an organic cation selected from the group consisting of ammonium, phosphonium, sulfonium, uronium, thiouronium, guanidinium and heterocyclic cations.

3. A formulation according to claim 1, wherein the cation, $C^+$, in the conductive additive is an organic cation selected from the group consisting of tetraalkylammonium, tetraalkyl-phosphonium, N-alkylpyridinium, N,N-dialkylpyrrolidinium, 1,3-dialkylimidazolium or trialkylsulfonium cations.

4. A formulation according to claim 1, wherein the cation, $A^-$, in the conductive additive is an anion selected from the group consisting of halide, borate, imide, phosphate, sulfonate, sulfate, succinate, naphthenate and carboxylate anions.

5. A formulation according to claim 1, wherein the cation, $A^-$, in the conductive additive is an anion selected from the group consisting of the following anions: chloride, bromide, iodide, tetrafluoroborate, tetracyanoborate (TCB), difluoro-dicyano borate, fluoro-tricyano borate, perfluoroalkyl-fluoro-dicyano borate, pentafluoroethyl-fluoro-dicyano borate, perfluoroalkyl-difluoro-cyano borate, pentafluoroethyl-difluoro-cyano borate, perfluoroalkyl-fluoro borate (FAB), perfluoroalkyl-alkoxy-dicyano borate, alkoxy-tricyano borate, methoxy-tricyano borate, ethoxy-tricyano borate, 2,2,2-trifluoroethoxy-tricyano borate, bis(2,2,2-trifluoroethoxy)-dicyano borate, tetraphenylborate (TPB), tetrakis(3,5-bis(trifluoromethyl)phenyl)borate (TFPB), tetrakis (4-chlorophenyl)borate, tetrakis(4-fluorophenyl)borate, tetrakis(pentafluorophenyl)borate, tetrakis(2,2,2-trifluoroethoxy)borate, bis(oxalato)borate, bis(trifluoromethylsulfonyl)imide (NTF), bis(fluorosulfonyl)imide, bis[bis(pentafluoroethyl)phosphinyl]imide (FPI), tris(trifluoromethylsulfonyl)methide, (fluoroalkyl) fluorophosphates, tris(pentafluoroethyl)trifluorophosphate (FAP), bis(pentafluoroethyl)tetrafluorophosphate, (pentafluoroethyl)pentafluorophosphate, tris(nonafluorobutyl)trifluorophosphate, bis(nonafluorobutyl)tetrafluorophosphate, (nonafluorobutyl)pentafluorophosphate, hexafluorophosphate, bis(fluoroalkyl)phosphinate, bis(pentafluoroethyl) phosphinate, bis(nonafluorobutyl)phosphinate, (fluoroalkyl) phosphonate, (pentafluoroethyl)phosphonate, (nonafluorobutyl)phosphonate, nonafluorobutane sulfonate (nonaflate) (NFS), trifluoromethanesulfonate, trifluoroacetate, methanesulfonate, butanesulfonate, butylsulfate, hexylsulfate, octylsulfate, dicyanamide, tricyanomethide, thiocyanate, hydrogensulfate, trifluoroacetate, tosylate, (bis(2-2-ethyl hexyl) sulfosuccinate (AOT), naphthenates, lauryl sulphate, alkyl benzene sulfonates, alkyl naphthalene sulfonate), alkyl aryl ether phosphates, alkyl ether phosphate, and alkyl carboxylates, wherein alkyl is $C_1$-$C_{20}$ alkyl, fluoroalkyl is fluorinated $C_1$-$C_{20}$ alkyl, perfluoroalkyl is $C_1$-$C_{20}$ perfluoroalkyl, and aryl is optionally substituted $C_5$-$C_8$-aryl.

6. A formulation according to claim 1, wherein the conductive additive is selected from formulae 1a-1c:

$$P^1\text{-Sp-}[NR^aR^bR^c]^+A^- \qquad \text{1a}$$

$$P^1\text{-Sp-}[PR^aR^bR^c]^+A^- \qquad \text{1b}$$

$$P^1\text{-Sp-}[SR^aR^bR^c]^+A^- \qquad \text{1c}$$

wherein $P^1$, Sp and $A^-$ are as defined in claim 1, and
$R^a$, $R^b$, $R^c$ independently of each other denote straight-chain, branched or cyclic alkyl with 1 to 25 C-atoms, wherein one or more $CH_2$ groups are optionally replaced, in each case independently from one another, by —O—, —S—, —NH—, —NR$^{00}$—, —CO—, —CH═CH— or —C≡C— in such a manner that O and/or S atoms are not linked directly to one another, and wherein one or more H atoms may also be replaced by F, Cl, Br, I or CN, or two of $R^a$, $R^b$ and $R^c$ together with the $N^+$ atom form an aliphatic or aromatic ring with 4 to 8 C atoms which is optionally substituted by one or more groups L,
L is $P^1$-Sp-, F, Cl, Br, I, —CN, —NO$_2$, —NCO, —NCS, —OCN, —SCN, —C(═O)NR$^{00}$R$^{000}$, —C(═O)X, —C(═O)OR$^{00}$, —C(═O)R$^0$, —NR$^{00}$R$^{000}$, —OH, —SF$_5$, optionally substituted silyl, aryl or heteroaryl with 1 to 12 C atoms, and straight chain or branched alkyl, alkoxy, alkylcarbonyl, alkoxycarbonyl, alkylcarbonyloxy or alkoxycarbonyloxy with 1 to 12 C atoms, wherein one or more H atoms are optionally replaced by F or Cl,
$R^{00}$, $R^{000}$ independently of each other denote H or alkyl with 1 to 12 C-atoms, and
X is halogen.

7. A formulation according to claim 6, wherein:
$P^1$ is an acrylate or methacrylate group; and
$R^a$, $R^b$ and $R^c$ are straight-chain or branched alkyl with 1 to 12 C atoms.

8. A formulation according to claim 6, wherein:
the compounds of formula 1a-c are selected from the compounds of formula 1a1-1c1:

$$P^1\text{—}(CH_2)_t\text{—}[NR^aR^bR^c]^+A^- \qquad \text{1a1}$$

$$P^1\text{—}(CH_2)_t\text{—}[PR^aR^bR^c]^+A^- \qquad \text{1b1}$$

$$P^1\text{—}(CH_2)_t\text{—}[SR^aR^bR^c]^+A^- \qquad \text{1c1}$$

wherein t is an integer from 1 to 12.

9. A formulation according to claim 8, wherein:
$P^1$ is an acrylate or methacrylate group; and
$R^a$, $R^b$ and $R^c$ denote straight-chain or branched alkyl with 1 to 12 C atoms.

10. A formulation according to claim 1, which comprises one or more polymerisable mesogenic compounds having only one polymerisable functional group (monoreactive), and one or more polymerisable mesogenic compounds having two or more polymerisable functional groups (di- or multireactive).

11. A formulation according to claim 1, wherein:
the group $P^1$-Sp-$C^+$ containing the cation is selected from the group consisting of:
N-[2-(methacryloyloxy)ethyl]-N,N,N-trialkylammonium;
N-[2-(methacryloyloxy)ethyl]-N,N,N-trimethylammonium (MOTMA);
N-[2-(methacryloyloxy)propyl]-N,N,N-trimethylammonium;
N-[2-(methacryloyloxy)ethyl]-N,N,N-trihexylammonium (MOTHA);
N-[2-(methacryloyloxy)propyl]-N,N,N-trihexylammonium;
N-[(2-methacryloxy)-(AO)$_x$-A]-N,N,N-trialkylammonium;
1-[2-(methacryloyloxy)ethyl]-3-butylimidazolium;
1-(2-methacryloxyethyl)-3-methylimidazolium;
1-[(2-methacryloxy)-(AO)$_x$-A]-3-methylimidazolium;
1-[2-(methacryloyloxy)ethyl]-1-butylpyrrolidinium;
1-(2-methacryloxyethyl)-1-methylpyrrolidinium;
1-[(2-methacryloxy)-(AO)$_x$-A]-1-methylpyrrolidinium, wherein (AO)$_x$ is a polyalkyl oxide with x=1-10, and A is alkylene;
1-[(2-methacryloxy)-C$_y$]-3-methylimidazolium;
1-[(2-methacryloxy)-C$_y$]-1-methylpyrrolidinium, wherein C$_y$ is an alkyl chain with y=1 to 12;
N-(acryloxy-ethyl)-N,N,N-trimethyl ammonium (AOTMA);
N-(acryloxy-ethyl)-N,N,N-trihexyl ammonium (AOTHA);
N-(acryloxy-propyl)-N,N,N-trihexyl ammonium;
N-[3-(methacryloylamino)propyl]-N,N,N-trimethylammonium;
N-[3-(methacryloylamino)propyl]-N,N,N-trihexylammonium;
N,N,N,N-tetraallyl ammonium;
1-allyl-3-methylimidazolium;
1-allyl-1-methylpyrrolidinium;
N-butyl-4-vinyl-pyridinium;
N-ethyl-4-vinyl-pyridinium;
N-methyl-4-vinyl-pyridinium;
N-methyl-2-vinyl-pyridinium;

N,N-diallyl-N,N-dimethyl ammonium; and
N-(vinylbenzyl)-N,N,N-trimethylammonium.

12. A formulation according to claim 1, wherein:
the group P¹-Sp-C⁺ containing the cation is
N-[2-(methacryloyloxy)ethyl]-N,N,N-trimethylammonium (MOTMA) or
N-[2-(methacryloyloxy)ethyl]-N,N,N-trihexylammonium (MOTHA).

13. A formulation according to claim 1, wherein the ionic organic compound of the formula 1 is a compound containing one of the following combinations of polymerizable group P¹-Sp-C⁺ containing the cation and anion group, A⁻:

| | Polymerisable Cation | Anion |
|---|---|---|
| MOTMA-TFPB | | |
| MOTHA-TFPB | | |
| MOTHA-FAP | | $[(C_2F_5)_3PF_3]^-$ |
| MOTHA-NFS | | $[C_4F_9SO_3]^-$ |
| MOTHA-NTF | | $[N(SO_2CF_3)_2]^-$ |
| MOTHA-TCB | | $[B(CN)_4]^-$ |

| Polymerisable Cation | Anion |
|---|---|
| MOTMA-AOT | |
| MOTMA-NTF | $[N(SO_2CF_3)_2]^-$ |
| MOTMA-C | $Cl^-$ |
| MOTMA-MS | $[CH_3SO_3]^-$. |

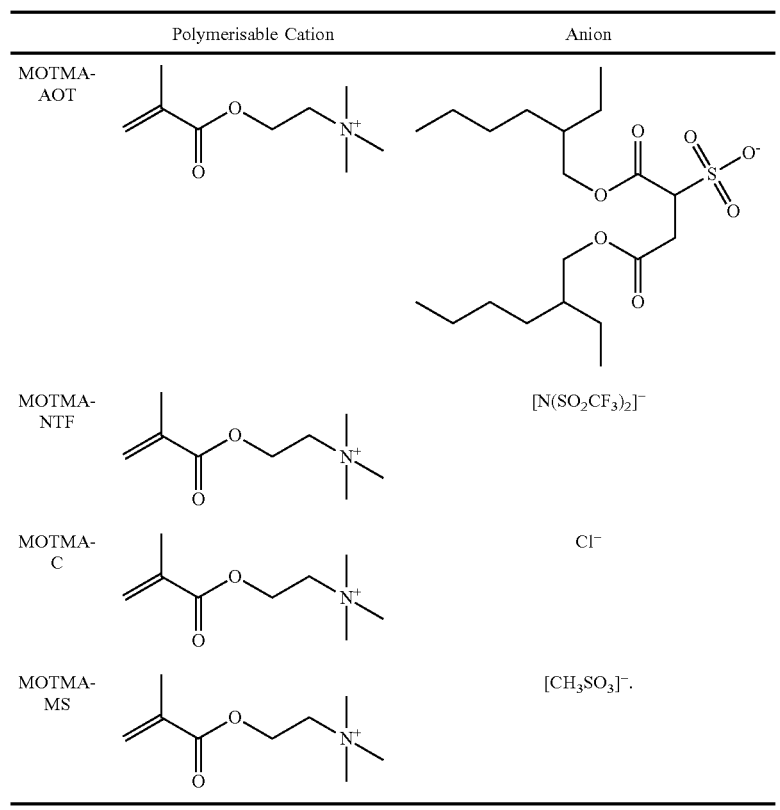

14. A formulation according to claim 1, wherein the polymerisable mesogenic compounds comprise one or more reactive mesogen compounds of formula I $$P^1\text{-}Sp^1\text{-}MG\text{-}Sp^2\text{-}P^2 \qquad I$$

wherein $P^1$ and $P^2$ are independently of each other a polymerisable group, $Sp^1$ and $Sp^2$ are independently of each other a spacer group or a single bond, and MG is a rod-shaped mesogenic group of formula II $$-(A^1\text{-}Z^1)_n\text{-}A^2\text{-} \qquad II$$

wherein $A^1$ and $A^2$ denote, in case of multiple occurrence independently of one another, an aromatic or alicyclic group, which optionally contains one or more heteroatoms selected from N, O and S, and is optionally mono- or polysubstituted by L, L is P-Sp-, F, Cl, Br, I, —CN, —NO$_2$, —NCO, —NCS, —OCN, —SCN, —C(=O)NR$^{00}$R$^{000}$, —C(=O)X, —C(=O)OR$^{00}$, —C(=O)R$^0$, —NR$^{00}$R$^{000}$, —OH, —SF$_5$, optionally substituted silyl, aryl or heteroaryl with 1 to 12, and straight chain or branched alkyl, alkoxy, alkylcarbonyl, alkoxycarbonyl, alkylcarbonyloxy or alkoxycarbonyloxy with 1 to 12 C atoms, wherein one or more H atoms are optionally replaced by F or Cl, P is a polymerisable group, Sp is a spacer group or a single bond, $R^0$, $R^{00}$ and $R^{000}$ independently of each other denote H or alkyl with 1 to 12 C-atoms, X is halogen, $Z^1$ denotes, in case of multiple occurrence independently of one another, —O—, —S—, —CO—, —COO—, —OCO—, —S—CO—, —CO—S—, —O—COO—, —CO—NR$^{00}$—, —NR$^{00}$—CO—, —NR$^{00}$—CO—NR$^{000}$, —NR$^{00}$—CO—O—, —O—CO—NR$^{00}$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_{n1}$, —CF$_2$CH$_2$—, —CH$_2$CF$_2$—, —CF$_2$CF$_2$—, —CH=N—, —N=CH—, —N=N—, —CH=CR$^{00}$—, —CY$^1$=CY$^2$—, —C≡C—, —CH=CH—COO—, —OCO—CH=CH— or a single bond, $Y^1$ and $Y^2$ independently of each other denote H, F, Cl or CN, n is 1, 2, 3 or 4, and n1 is an integer from 1 to 10.

15. A formulation according to claim 14, which comprises one or more reactive mesogen compounds of formula Ia

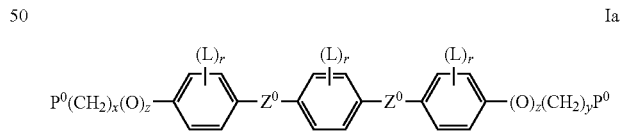

wherein $P^0$ is, in case of multiple occurrences independently of one another, a polymerisable group, $Z^0$ is —COO—, —OCO—, —CH$_2$CH$_2$—, —CF$_2$O—, —OCF$_2$—, —C≡C—, —CH=CH—, —OCO—CH=CH—, —CH=CH—COO—, or a single bond, L has the meanings given in claim 14, r is 0, 1, 2, 3 or 4, x and y are independently of each other 0 identical or different integers from 1 to 12, and z is 0 or 1, with z being 0 if the x or y of the adjacent group is 0.

16. A formulation according to claim 15, wherein the polymerisable mesogenic compounds comprise one or more reactive mesogen compounds selected from the following formulae:
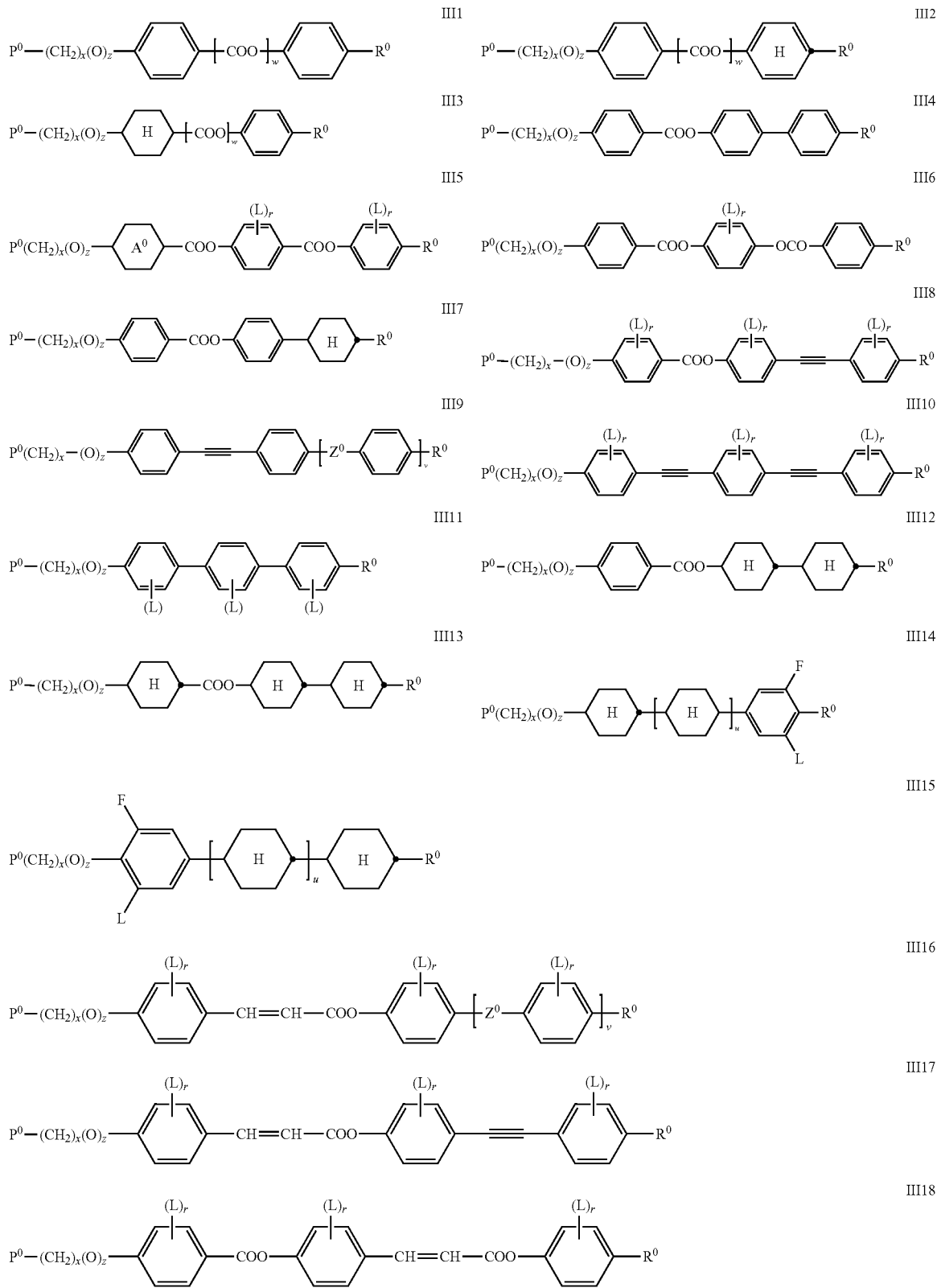

-continued

III19
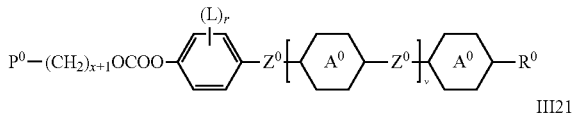

III20

III21

III22
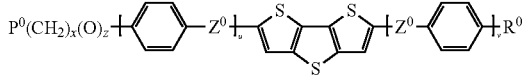

III23
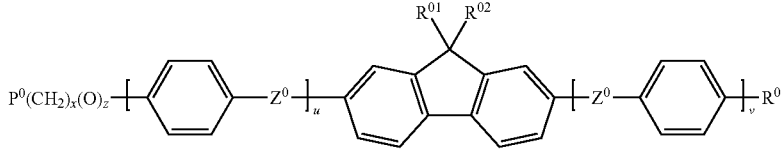

III24

III25
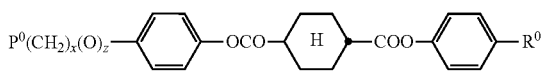

III26

III27
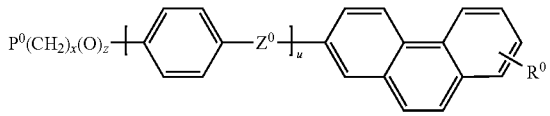

wherein
P⁰ is, in case of multiple occurrences independently of one another, a polymerisable group,
L are independently of one another, selected from F, Cl, CN or optionally halogenated alkyl, alkoxy, alkylcarbonyl, alkoxycarbonyl, alkylcarbonyloxy or alkoxycarbonyloxy with 1 to 5 C atoms,
r is 0, 1, 2, 3 or 4,
x and y are independently of each other 0 or identical or different integers from 1 to 12,
z is 0 or 1, with z being 0 if the x or y of the adjacent group is 0,
R⁰ is alkyl, alkoxy, thioalkyl, alkylcarbonyl, alkoxycarbonyl, alkylcarbonyloxy or alkoxycarbonyloxy with 1 to 15 C atoms which is optionally fluorinated, or denotes Y⁰ or P—(CH₂)ᵧ—(O)ᵤ—,
X⁰ is —O—, —S—, —CO—, —COO—, —OCO—, —O—COO—, —CO—NR⁰¹—, —NR⁰¹—CO—, —NR⁰¹—CO—NR⁰¹—, —OCH₂—, —CH₂O—, —SCH₂—, —CH₂S—, —CF₂O—, —OCF₂—, —CF₂S—, —SCF₂—, —CF₂CH₂—, —CH₂CF₂—, —CF₂CF₂—, —CH=N—, —N=CH—, —N=N—, —CH=CR⁰¹—, —CF=CF—, —C≡C—, —CH=CH—COO—, —OCO—CH=CH— or a single bond,
Y⁰ is F, Cl, CN, NO₂, OCH₃, OCN, SCN, SF₅, optionally fluorinated alkylcarbonyl, alkoxycarbonyl, alkylcarbonyloxy or alkoxycarbonyloxy with 1 to 4 C atoms, or mono- oligo- or polyfluorinated alkyl or alkoxy with 1 to 4 C atoms,
A⁰ is, in case of multiple occurrence independently of one another, 1,4-phenylene that is unsubstituted or substituted with 1, 2, 3 or 4 groups L, or trans-1,4-cyclohexylene, R⁰¹ and R⁰² are independently of each other H, R⁰ or Y⁰,
u and v are independently of each other 0, 1 or 2,
w is 0 or 1,
and wherein the benzene and napthalene rings can additionally be substituted with one or more identical or different groups L.
17. A formulation according to claim 14, wherein in formula I
P¹ and P² are selected from CH₂=CH—COO—, CH₂=C(CH₃)—COO—, CH₂=CF—COO—, (CH₂=CH)₂CH—OCO—, (CH₂=CH)₂CH—O—,

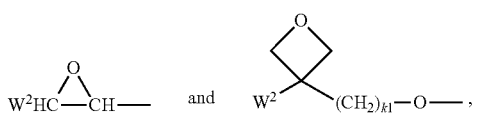

W²HC—CH— and W²(CH₂)ₖ₁—O—, W² being H or alkyl with 1 to 5 C-atoms,
L is P-Sp-, F, Cl, Br, I, —CN, —NO₂, —NCO, —NCS, —OCN, —SCN, —C(=O)NR⁰⁰R⁰⁰⁰, —C(=O)X, —C(=O)OR⁰⁰, —C(=O)R⁰, —NR⁰⁰R⁰⁰⁰, —OH, —SF₅, optionally substituted silyl, aryl or heteroaryl with 1 to 12 C atoms, and straight chain or branched alkyl, alkoxy, alkylcarbonyl, alkoxycarbonyl, alkylcarbonyloxy or alkoxycarbonyloxy with 1 to 6 C atoms, wherein one or more H atoms are optionally replaced by F or Cl,
P is a polymerisable group,
Sp is a spacer group or a single bond,
X is F or Cl,
Z¹ is —COO—, —OCO— or a single bond, n is 1 or 2, and
n1 is 1, 2, 3 or 4.

18. A formulation according to claim 1, wherein the polymerisable mesogenic compounds comprise one or more reactive mesogen compounds of formula III $$P^1\text{-}Sp^1\text{-}MG\text{-}R \qquad \qquad III$$

wherein $P^1$ is a polymerisable group, $Sp^1$ is a spacer group or a single bond, and MG is a rod-shaped mesogenic group of formula II $$\text{-}(A^1\text{-}Z^1)_n\text{-}A^2\text{-} \qquad \qquad II$$

wherein $A^1$ and $A^2$ denote, in case of multiple occurrence independently of one another, an aromatic or alicyclic group, which optionally contains one or more heteroatoms selected from N, O and S, and is optionally mono- or polysubstituted by L, L is P-Sp-, F, Cl, Br, I, —CN, —NO$_2$, —NCO, —NCS, —OCN, —SCN, —C(=O)NR$^{00}$R$^{000}$, —C(=O)X, —C(=O)OR$^{00}$, —C(=O)R$^0$, —NR$^{00}$R$^{000}$, —OH, —SF$_5$, optionally substituted silyl, aryl or heteroaryl with 1 to 12 C atoms, and straight chain or branched alkyl, alkoxy, alkylcarbonyl, alkoxycarbonyl, alkylcarbonyloxy or alkoxycarbonyloxy with 1 to 12 C atoms, wherein one or more H atoms are optionally replaced by F or Cl, P is a polymerisable group, Sp is a spacer group or a single bond, $Z^1$ denotes, in case of multiple occurrence independently of one another, —O—, —S—, —CO—, —COO—, —OCO—, —S—CO—, —CO—S—, —O—COO—, —CO—NR$^{00}$—, —NR$^{00}$—CO—, —NR$^{00}$—CO—NR$^{000}$, —NR$^{00}$—CO—O—, —O—CO—NR$^{00}$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_{n1}$, —CF$_2$CH$_2$—, —CH$_2$CF$_2$—, —CF$_2$CF$_2$—, —CH=N—, —N=CH—, —N=N—, —CH=CR$^{000}$—, —CY$^1$=CY$^2$—, —C≡C—, —CH=CH—COO—, —OCO—CH=CH—or a single bond, $Y^1$ and $Y^2$ independently of each other denote H, F, Cl or CN, n is 1, 2, 3 or 4, n1 is an integer from 1 to 10, R denotes P-Sp-, F, Cl, Br, I, —CN, —NO$_2$, —NCO, —NCS, —OCN, —SCN, —C(=O)NR$^{00}$R$^{000}$, —C(=O)X, —C(=O)OR$^0$, —C(=O)R$^{00}$, —NR$^{00}$R$^{000}$, —OH, —SF$_5$, optionally substituted silyl, straight chain or branched alkyl, alkoxy, alkylcarbonyl, alkoxycarbonyl, alkylcarbonyloxy or alkoxycarbonyloxy with 1 to 12 C atoms, wherein one or more H atoms are optionally replaced by F or Cl, X is halogen, and $R^0$, $R^{00}$ and $R^{000}$ are independently of each other H or alkyl with 1 to 12 C-atoms.

19. A formulation according to claim 18, wherein in formula III:

$P^1$ and $P^2$ are selected from CH$_2$=CH—COO—, CH$_2$=C(CH$_3$)—COO—, CH$_2$=CF—COO—, (CH$_2$=CH)$_2$CH—OCO—, (CH$_2$=CH)$_2$CH—O—,

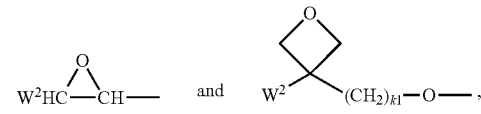

W$^2$HC—CH— and W$^2$ (CH$_2$)$_{k1}$—O— W$^2$ being H or alkyl with 1 to 5 C-atoms, L is P-Sp-, F, Cl, Br, I, —CN, —NO$_2$, —NCO, —NCS, —OCN, —SCN, —C(=O)NR$^{00}$R$^{000}$, —C(=O)X, —C(=O)OR$^{00}$, —C(=O)R$^0$, —NR$^{00}$R$^{000}$, —OH, —SF$_5$, optionally substituted silyl, aryl or heteroaryl with 1 to 6 C atoms, and straight chain or branched alkyl, alkoxy, alkylcarbonyl, alkoxycarbonyl, alkylcarbonyloxy or alkoxycarbonyloxy with 1 to 6 C atoms, wherein one or more H atoms are optionally replaced by F or Cl, $Z^1$ is, in case of multiple occurrences independently of one another, —COO—, —OCO— or a single bond, n is 1 or 2, n1 is 1, 2, 3 or 4, R denotes P-Sp-, F, Cl, Br, I, —CN, —NO$_2$, —NCO, —NCS, —OCN, —SCN, —C(=O)NR$^{00}$R$^{000}$, —C(=O)X, —C(=O)OR$^0$, —C(=O)R$^{00}$, —NR$^{00}$R$^{000}$, —OH, —SF$_5$, optionally substituted silyl, straight chain or branched alkyl, alkoxy, alkylcarbonyl, alkoxycarbonyl, alkylcarbonyloxy or alkoxycarbonyloxy with 1 to 6 C atoms, wherein one or more H atoms are optionally replaced by F or Cl, and X is F or Cl.

* * * * *